United States Patent [19]
Antonio et al.

[11] Patent Number: 5,621,752
[45] Date of Patent: Apr. 15, 1997

[54] ADAPTIVE SECTORIZATION IN A SPREAD SPECTRUM COMMUNICATION SYSTEM

[75] Inventors: Franklin P. Antonio, Del Mar, Calif.; Klein S. Gilhousen, Bozeman, Mont.; Jack K. Wolf, La Jolla; Ephraim Zehavi, San Diego, both of Calif.

[73] Assignee: Qualcomm Incorporated, San Diego, Calif.

[21] Appl. No.: 265,664

[22] Filed: Jun. 23, 1994

[51] Int. Cl.$^6$ ............................ H04B 15/00; H04K 1/00; H04L 27/30
[52] U.S. Cl. .................. 375/200; 375/208; 375/347; 375/367; 370/335
[58] Field of Search .................................. 375/200–208, 375/260, 264, 267, 316, 347, 349, 367, 205; 455/432–135, 277.1, 277.2, 278.1, 279.1, 140; 370/18, 95.1

[56] References Cited

U.S. PATENT DOCUMENTS

| | | | |
|---|---|---|---|
| 4,101,836 | 7/1978 | Craig et al. ............................ | 325/302 |
| 4,255,791 | 3/1981 | Martin .................................. | 364/514 |
| 4,361,891 | 11/1982 | Lobenstein et al. .................. | 375/205 |
| 4,435,840 | 3/1984 | Kojima et al. ........................ | 455/33 |
| 4,485,486 | 11/1984 | Webb et al. .......................... | 455/33 |
| 4,549,311 | 10/1985 | McLaughlin ......................... | 455/277 |
| 4,652,880 | 3/1987 | Moeller et al. ....................... | 342/373 |
| 4,704,734 | 11/1987 | Menich et al. ....................... | 455/33 |
| 4,726,050 | 2/1988 | Menich et al. ....................... | 379/60 |
| 4,750,036 | 6/1988 | Martinez ............................... | 358/147 |
| 4,901,307 | 2/1990 | Gilhousen et al. ................... | 370/18 |
| 5,021,801 | 6/1991 | Smith et al. .......................... | 343/876 |
| 5,048,116 | 9/1991 | Schaeffer ............................. | 455/33 |
| 5,187,806 | 2/1993 | Johnson et al. ...................... | 455/15 |
| 5,193,109 | 3/1993 | Lee ....................................... | 379/60 |
| 5,241,685 | 8/1993 | Bodin et al. .......................... | 455/33.2 |
| 5,265,263 | 11/1993 | Ramsdale et al. ................... | 455/33.2 |
| 5,276,907 | 1/1994 | Meidan ................................. | 455/33.2 |
| 5,343,173 | 8/1994 | Balodis et al. ....................... | 333/126 |
| 5,404,576 | 4/1995 | Yahagi ................................. | 455/56.1 |
| 5,414,728 | 5/1995 | Zehavi ................................. | 375/200 |
| 5,422,908 | 6/1995 | Schilling ............................. | 375/203 |
| 5,428,818 | 6/1995 | Meidan et al. ....................... | 455/33.3 |
| 5,469,468 | 11/1995 | Schilling ............................. | 375/200 |
| 5,471,497 | 11/1995 | Zehavi ................................. | 375/200 |
| 5,515,378 | 5/1996 | Roy, III et al. ...................... | 370/95.1 |

FOREIGN PATENT DOCUMENTS

| | | | |
|---|---|---|---|
| 0591770 | 4/1994 | European Pat. Off. .......... | H04B 7/02 |
| 9312590 | 6/1993 | WIPO ............................ | H04B 7/26 |
| 9210074 | 6/1993 | WIPO ............................ | H04B 7/26 |

OTHER PUBLICATIONS

"A Spectrum Efficient Cellular Base–Station Antenna Architecture", Sixth International Conference On Mobile Radio and Personal Communications, S. C. Swales et al., pp. 272–279, Conference Publication No. 351.

"Multi–Beam Adaptive Base–Station Antennas for Cellular Land Mobile Radio Systems", 39th IEEE Vehicular Technology Conference, S. C. Swales et al., vol. I, May 1–3, 1989, San Francisco, California, pp. 341–348.

"Smart Antenna Module", Northern Telecom Inc., Oct. 5, 1993, 4 pgs.

"PCS 1900 Advanced Services Generating Revenue for PCS Providers", Northern Telecom Inc., Sep. 1993, 13 pgs.

*Primary Examiner*—Stephen Chin
*Assistant Examiner*—Don Vo
*Attorney, Agent, or Firm*—Russell B. Miller; Sean English

[57] ABSTRACT

A system and method for adaptively sectorizing channel resources within a digital cellular communication system is disclosed herein. The system includes an antenna arrangement for providing at least first and second electromagnetic beams for receiving a first information signal transmitted by a specific one of a plurality of users, thereby generating first and second received signals. A first set of beam-forming signals are then generated from the first and second received signals. A demodulating receiver is provided for demodulating at least first and second beam-forming signals included within the first set of beam-forming signals, thereby producing first and second demodulated signals. The system further includes a tracking network for tracking multipath information signals, received from various positions and angles of incidence, based on comparison of the first and second demodulated signals.

33 Claims, 13 Drawing Sheets

ADAPTIVE SECTORIZATION IN A SPREAD SPECTRUM COMMUNICATION SYSTEM

BACKGROUND OF THE INVENTION

I. Field of the Invention

The present invention relates to communication systems utilizing spread spectrum signals, and, more particularly, to a novel and improved method and apparatus for adaptive sectorization within a spread spectrum communication system.

II. Description of the Related Art

Communication systems have been developed to allow transmission of information signals from a base station location to a physically distinct user or subscriber location. Both analog and digital methods have been used to transmit such information signals over communication channels linking the base station and user locations. Digital methods tend to afford several advantages relative to analog techniques, including, for example, improved immunity to channel noise and interference, increased capacity, and improved security of communication through the use of encryption.

In transmitting an information signal in either direction over a communication channel, the information signal is first converted into a form suitable for efficient transmission over the channel. Conversion, or modulation, of the information signal involves varying a parameter of a carrier wave on the basis of the information signal in such a way that the spectrum of the resulting modulated carrier is confined within the channel bandwidth. At the recipient location the original message signal is replicated from a version of the modulated carrier received subsequent to propagation over the channel. Such replication is generally achieved by using an inverse of the modulation process employed during message transmission.

Modulation also facilitates multiplexing, i.e., the simultaneous transmission of several signals over a common channel. Multiplexed communication systems will generally include a plurality of remote subscriber units requiring intermittent service rather than continuous access to the communication channel. Systems designed to enable communication with a selected subset of a full set of subscriber units have been termed multiple access communication systems.

A particular type of multiple access communication system, known as a code division multiple access (CDMA) modulation system, may be realized in accordance with spread spectrum techniques. In spread spectrum systems, the modulation technique utilized results in a spreading of the transmitted signal over a wide frequency band within the communication channel. Other multiple access communication system techniques, include time division multiple access (TDMA), and frequency division multiple access (FDMA). However, the spread spectrum modulation technique of CDMA has significant advantages over these modulation techniques for multiple access communication systems. The use of CDMA techniques in a multiple access communication system is disclosed in U.S. Pat. No. 4,901,307, issued Feb. 13, 1990, entitled "SPREAD SPECTRUM MULTIPLE ACCESS COMMUNICATION SYSTEM USING SATELLITE OR TERRESTRIAL REPEATERS", assigned to the assignee of the present invention.

In the above-referenced U.S. Pat. No. 4,901,307, a multiple access technique is disclosed where a large number of mobile system users each having a transceiver communicate through satellite repeaters or terrestrial base stations using CDMA spread spectrum communication signals. In using CDMA communications, the frequency spectrum can be reused multiple times thus permitting an increase in system user capacity. The use of CDMA results in a much higher spectral efficiency than can be achieved using other multiple access techniques.

For a particular cellular CDMA system, communication between a base station and subscriber units within the surrounding cell region is achieved by spreading each transmitted signal over the available channel bandwidth by using a unique user spreading code. In such CDMA systems the code sequences used for spreading the spectrum are constructed from two different types of sequences, each with different properties to provide different functions. For example, a first type of sequence used are the I and Q channel PN codes, which are shared by all signals in a cell or sector. In addition, each user may be identified by a unique long PN code, which is typically of a longer period than the I and Q channel PN codes.

Referring to FIG. 1, there is shown an exemplary CDMA communication cell 10 in which are disposed a plurality of fixed and mobile user subscriber units 12 and a base station 14. The subscriber units 12 are grouped into first, second and third user sectors 16, 18 and 20, each of which support an equivalent number of traffic channels. The base station 14 may include a set of fixed-beam antennas (not shown) dedicated to facilitating communication with subscriber units in each user sector. Alternatively, a three element antenna array could be utilized to divide the cell into the specified user sectors.

One advantage of the system of FIG. 1 is that the base station 14 typically includes a diversity receiver disposed to separately receive individual multipath echoes of the PN spread waveform transmitted by each subscriber unit 12. Multipath echoes may be created by reflection of the transmitted user signal from objects within the propagation environment. The individual multipath signals are then time aligned within separate receiver "fingers" dedicated to specific multipath signals, and are then combined in order to improve signal to noise ratio. When the cell 10 is partitioned into more than several sectors (e.g., six sectors), a relatively narrow beam is assigned to each sector. This increased sectorization may unfortunately hinder reception of those multipath signals outside each concentrated sector beam, thereby undesirably reducing signal to noise ratio.

Accordingly, it is an object of the present invention to provide an adaptive sectorization technique enabling separate tracking and reception of the direct and multipath signals transmitted to and from users within a digital communication system.

SUMMARY OF THE INVENTION

The present invention provides a system and method for adaptively sectorizing channel resources within a digital communication system such as, for example, a cellular communication system. The system includes an antenna arrangement for providing at least first and second electromagnetic beams for receiving a first information signal transmitted by a specific one of a plurality of users, thereby generating first and second received signals. A first set of beam-forming signals are then generated from the first and second received signals.

A demodulating receiver is provided for demodulating at least first and second beam-forming signals included within the first set of beam-forming signals, thereby producing first and second demodulated signals. The system further includes a tracking network for tracking multipath information signals, received from various positions and angles of incidence, based on comparison of the first and second demodulated signals.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

I. Introduction

As is described hereinafter, the present invention contemplates adaptively controlling the beam patterns produced by one or more antenna arrays within a spread spectrum communication system. In a preferred implementation, the one or more antenna arrays are clustered at the cell-site base stations of a cellular communication system. In accordance with the invention, separate sets of beams are provided for receiving both direct and indirect (i.e., multipath) signal transmissions from the subscriber unit associated with individual system subscribers. A novel tracking network allows the direct and multipath signal transmissions from a given subscriber unit to be separately tracked in both time and space. As is described below, "time tracking" is effected by adjusting the phase at which the received signals are correlated with a PN spreading sequence in accordance with the results of demodulation of the received signals.

Figure 1:
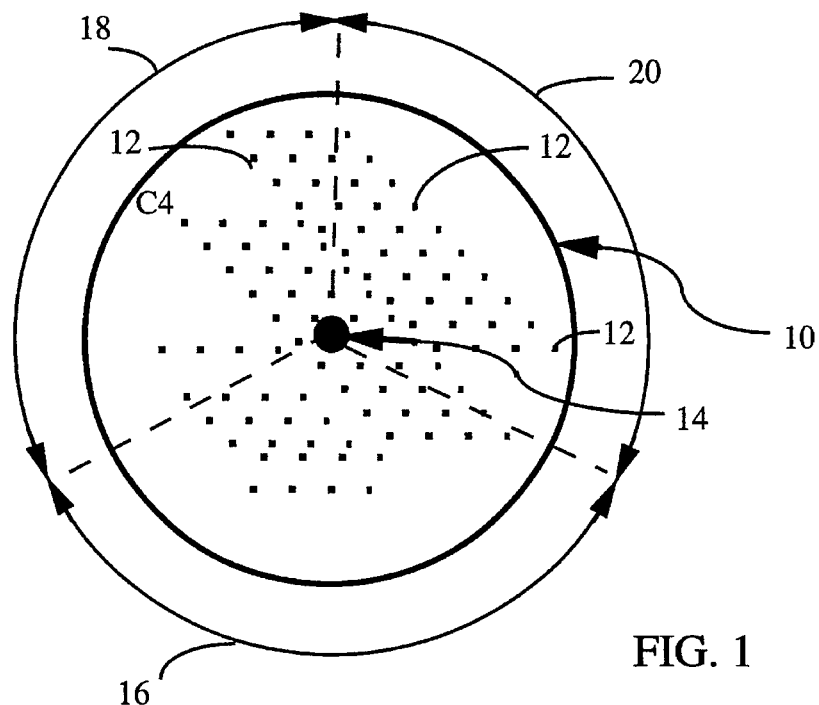
FIG. 1 shows an exemplary multiple-access communication system, in which are disposed a plurality of subscriber units and a base station.
Figure 2:
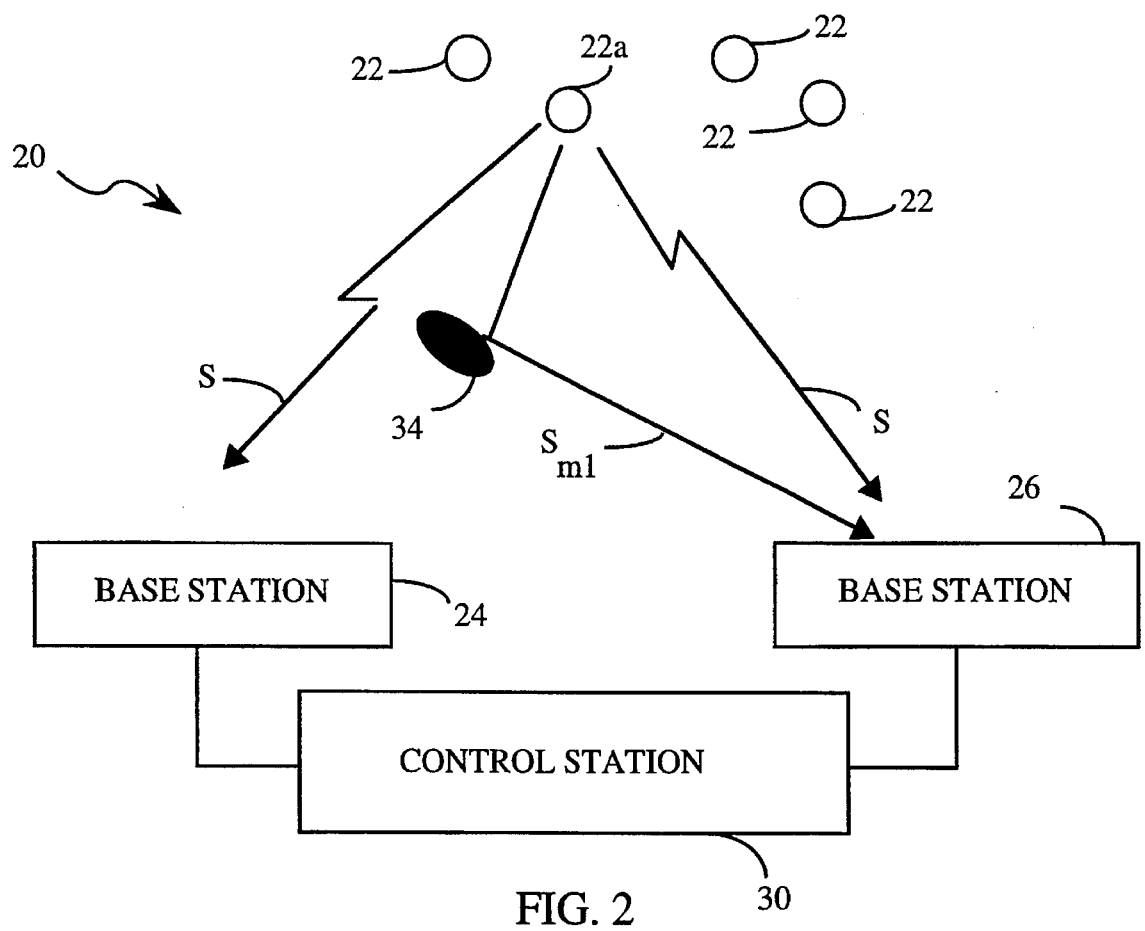
FIG. 2 shows a preferred embodiment of a spread spectrum communication system in which directly transmitted and multipath signals are received in accordance with the invention.

Referring to FIG. 2, there is shown a spread spectrum communication system 20 in accordance with the invention. Within the communication system 20 are disposed a plurality of fixed and mobile subscriber units 22, first and second base stations 24 and 26, and a control station 30. The base stations 24 and 26 each include an antenna array (not shown) for receiving signals from the subscriber units 22. In the system 20 each subscriber unit 22 is assigned a unique pseudorandom (PN) code, thereby allowing discrimination between user signals transmitted over a plurality of "traffic channels" associated with the subscriber units 22. This discrimination is achieved even though all system traffic channels may be transmitted over a single radio frequency channel.

As is indicated by FIG. 2, an information signal S transmitted by subscriber unit 22a is incident upon a proximately located first object 34 (e.g., a building). The signal S is seen to be directly received by base stations 24 and 26, while a first multipath component ($S_{m1}$) of the signal S is reflected by the object 34 to the base station 26. In accordance with the invention, the signals S and $S_{m1}$ are respectively tracked by the base stations 24 and 26 in both time and space. After demodulation within the base stations 24 and 26, the demodulated signals S and $S_{m1}$ are transmitted to the control station 30. Within the control station 30 the demodulated signals are time-aligned and combined within a spread spectrum diversity receiver. A preferred implementation of such a diversity receiver is described in detail below.

In accordance with the invention, the antenna array of each base station generates an antenna pattern which may be characterized as including a set of adjacent electromagnetic "beams", which may partially overlap in space. First and second subsets of beams are provided by the base station 26 to separately track and receive the signals S and $S_{m1}$. In a preferred embodiment, different subsets of beams are dynamically assigned to track and receive the signals S and $S_{m1}$ in response to changes in the angles of incidence thereof upon the base station 26. These changes may arise from, for example, motion of the subscriber unit 22a or from movement of object 34. Similar changes in angle of incidence could result from motion of the base station 26 in embodiments wherein, for example, the base station 26 is deployed on an orbiting satellite.

Within the base station 26, a diversity receiver is provided which includes a "finger" dedicated to receiving the directly transmitted signal S and a finger for receiving the multipath signal $S_{m1}$. After demodulation of the received signals within each finger using the PN code associated with the subscriber unit 22a, the demodulated signals are time-aligned and combined. In this way the signal to noise ratio of an information signal extracted from the combined signals is improved relative to that which would be obtained using the signal received over only a single transmission path.

II. Detailed Description

A. Spread Spectrum Signal Transmission

Figure 3:
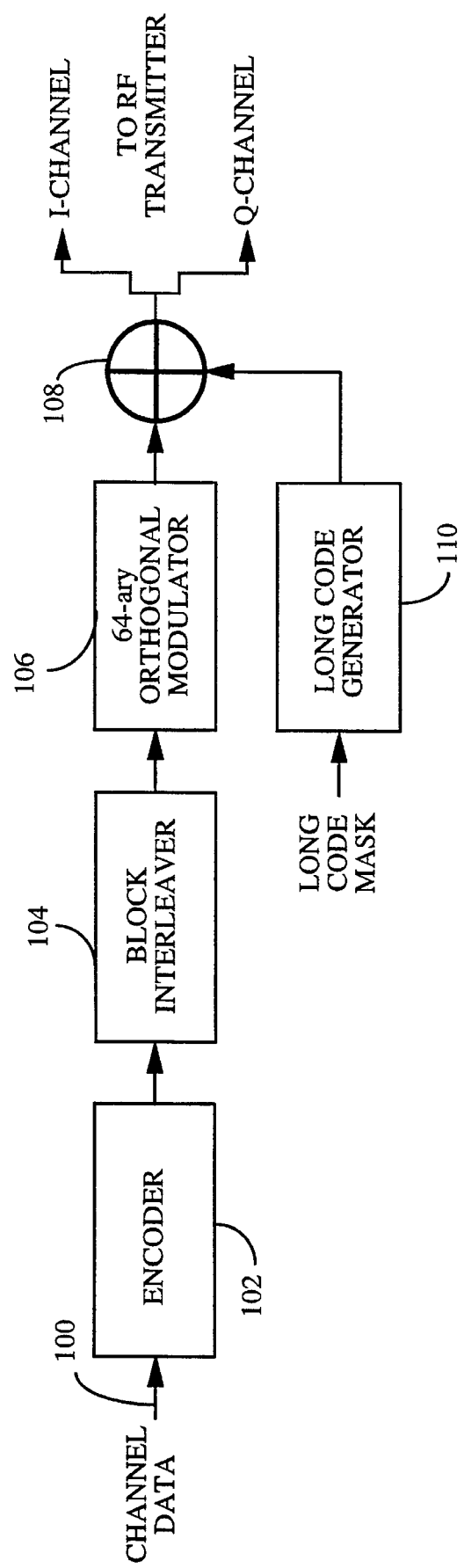
FIG. 3 shows a block diagrammatic representation of a spread spectrum transmitter suitable for utilization within a preferred embodiment of the invention.

Referring to FIG. 3, there is shown a block diagrammatic representation of a spread spectrum transmitter suitable for incorporation within the subscriber units 22 FIG. 2. In the preferred embodiment a form of orthogonal signaling such as binary, quaternary, or C-ary signaling is employed to provide a suitable ratio of signal to noise on the subscriber unit-to-base station link, i.e., on the "reverse" link. In addition, C-ary orthogonal signaling techniques are believed to be less susceptible to signal corruption resulting from Rayleigh fading and the like than are, for example, Costas loop or coherent PSK techniques. It is understood, however, that other modulation techniques may offer improved signal to noise ratio in, for example, embodiments involving base stations deployed on orbiting satellites.

In the transmitter of FIG. 3, data bits 100 consisting of, for example, voice converted to data by a vocoder, are supplied to an encoder 102 where the bits are convolutional encoded in accordance with the input data rate. When the data bit rate is less than the bit processing rate of the encoder 102, code symbol repetition may be used such that encoder 102 repeats the input data bits 100 in order to create a repetitive data stream at a bit rate which matches the operative rate of encoder 102. In an exemplary embodiment the encoder 102 receives data bits 100 at a nominal rate (Rb) of 9.6 kbits/second, and produces Rb/r symbols/second, where "r" denotes the code rate (e.g. ⅓) of the encoder 102. The encoded data is then provided to interleaver 104 where it is block interleaved.

Within the 64-ary (i.e., C=64) orthogonal modulator 106, the symbols are grouped into characters containing $\log_2 C$ symbols at a rate of $(1/r)(Rb/\log_2 C)$ characters/second, with there being C possible characters. In a preferred embodiment each character is encoded into a Walsh sequence of length C (e.g., C=64). That is, each Walsh sequence includes 64 binary bits or "chips", there being a set of 64 Walsh codes of length 64. The 64 orthogonal codes correspond to Walsh codes from a 64 by 64 Hadamard matrix wherein a Walsh code is a single row or column of the matrix.

The Walsh sequence produce, d by the modulator 106 is seen to be provided to an exclusive-OR combiner 108, where it is then "covered" or multiplied at a combiner with a PN code specific to a particular subscriber unit 22. Such a "long" PN code is generated at rate Rc by a PN long code generator 110 in accordance with a user PN long code mask. In an exemplary embodiment the long code generator 110 operates at an exemplary rate of 1.2288 MHz (Rc=1.2288 MHz), so as to produce four PN chips per Walsh chip.

Figure 4:
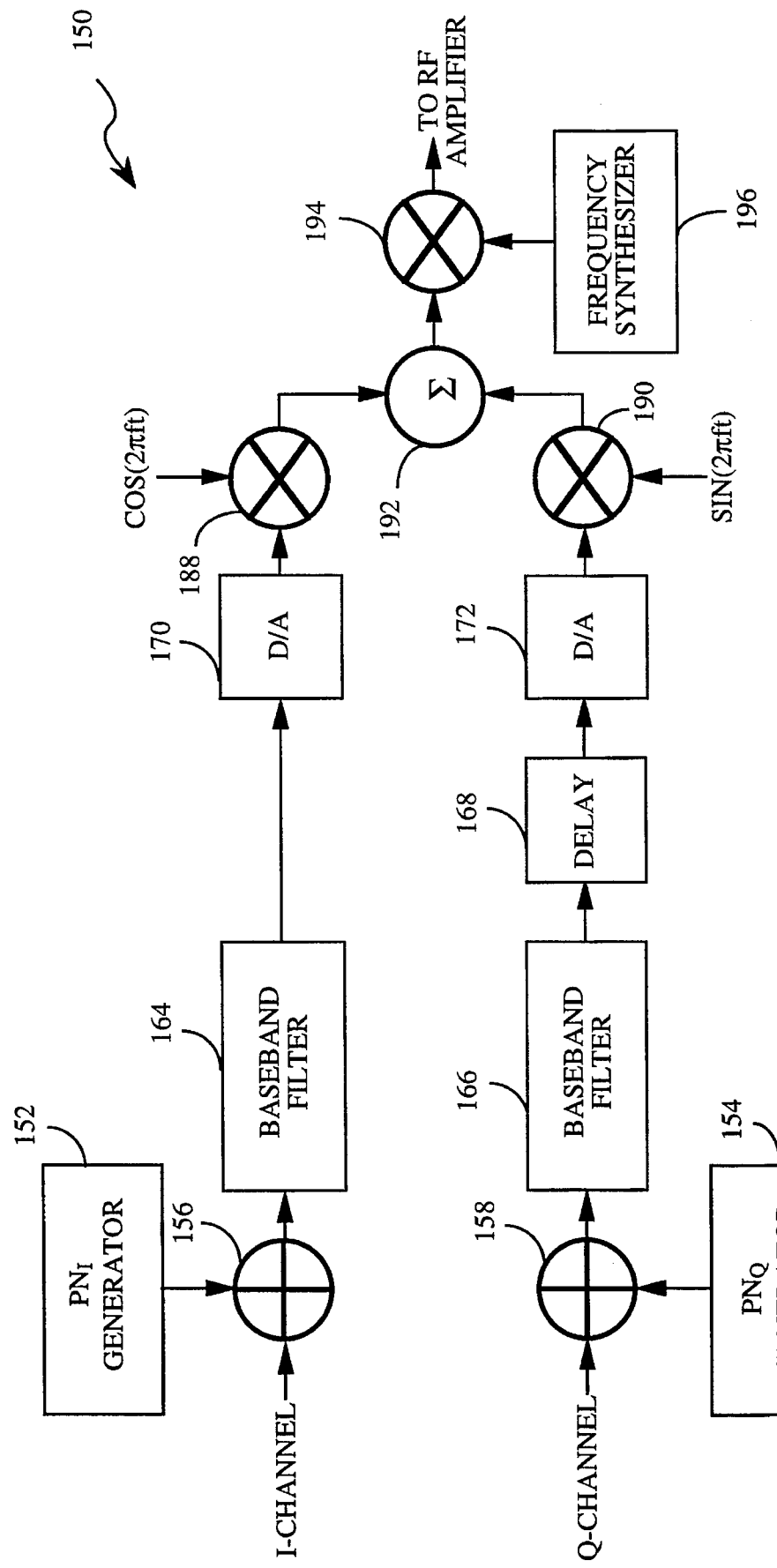
FIG. 4 is a block diagram of an exemplary RF transmitter.

Referring to FIG. 4, there is shown an exemplary implementation of the RF transmitter 150. In code division multiple access (CDMA) spread spectrum applications, a pair of short PN sequences, $PN_I$ and $PN_Q$, are respectively provided by a $PN_I$ generator 152 and by a $PN_Q$ generator 154 to exclusive-OR combiners 156 and 158. The $PN_I$ and $PN_Q$ sequences relate respectively to in-phase (I) and quadrature phase (Q) communication channels, and are generally of a length (32,768 chips) much shorter than the length of each user long PN code. The resulting I-channel code spread sequence 160 and Q-channel code spread sequence 162 then passed through baseband filters 164 and 166. The filtered Q-channel sequence may then be optionally delayed by ½ PN chip in order to compensate for RF amplifier nonlinearity.

Digital to analog (D/A) converters 170 and 172 are provided for converting the digital I-channel and Q-channel information, respectively, into analog form. The analog waveforms produced by D/A converters 170 and 172 are provided along with local oscillator (LO) carrier frequency signals $\cos(2\pi ft)$ and $\sin(2\pi ft)$, respectively, to mixers 188 and 190 where they are mixed and provided to summer 192. The quadrature phase carrier signals $\sin(2\pi ft)$ and $\cos(2\pi ft)$ are provided from suitable frequency sources (not shown).

These mixed IF signals are summed in summer 192 and provided to mixer 194.

Mixer 194 mixes the summed signal with an RF frequency signal from frequency synthesizer 196 so as to provide frequency upconversion to the RF frequency band. The RF signal includes in-phase (I) and quadrature phase (Q) components, and may then be bandpass filtered and output to an RF amplifier (not shown). It should be understood that differing implementations of the RF transmitter 150 may employ a variety of signal summing, mixing, filtering and amplification techniques not described herein, but which are well known to those in the art. Similarly, other known encoding and modulation formats may offer improved performance in certain alternate embodiments.

B. Overview of Base Station Receive Network

Figure 5A:
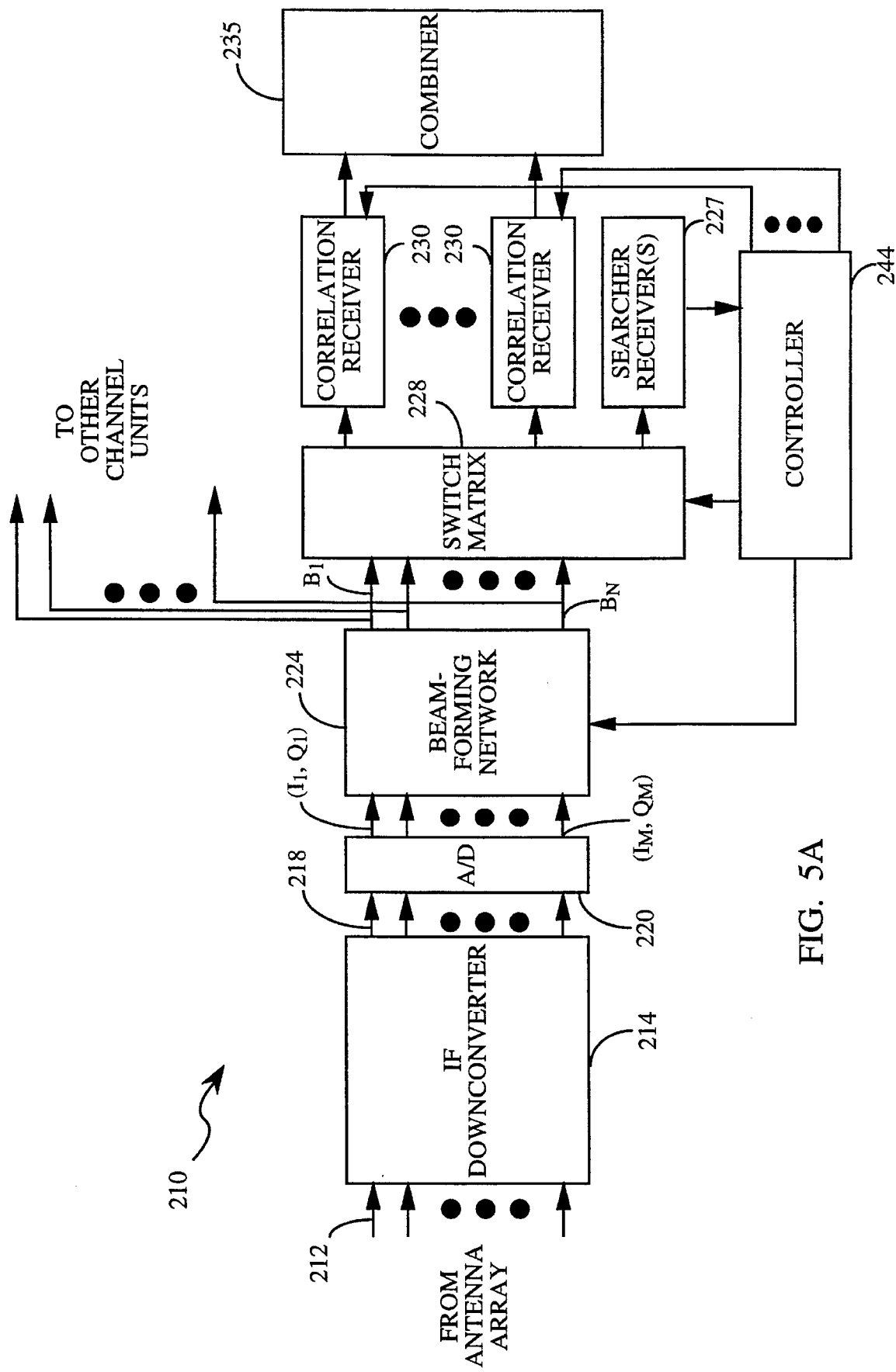
FIG. 5A provides a block diagrammatic representation of a base station receive network configured to enable adaptive sectorization in accordance with the invention.

Turning now to FIG. 5A, there is shown a block diagram of a base station receive network 210 configured in accordance with the invention. In the exemplary embodiments of FIGS. 5A and 5B, the base station antenna array is deployed at the same location as the signal processing portion of the receive network 210. As is described below with reference to FIGS. 5C and 5D, the antenna array may alternately be deployed at a remote location, with communication to the remainder of the receive network being established by way of a fiber optic communication link or the like.

Referring to FIG. 5A, an M-element antenna array (not shown) is seen to provide signals over a set of M signal lines 212. In the exemplary embodiment the antenna array comprises a number (M) of omnidirectional antenna elements uniformly arranged about a circular periphery, thereby enabling the reception of signals incident from any direction. A detailed description of an exemplary circular array is provided below in section F.

As is shown in FIG. 5A, the signal lines 212 are connected to an IF downconverter 214 operative to downconvert the signals from the antenna array to a set of IF signals 218. The IF signals 218 are each then sampled using a separate analog to digital converter, which are collectively represented by analog to digital (A/D) converter 220. The A/D converter 220 produces, at an exemplary rate approximately equivalent to four times the PN spreading rate, a set of M complex-valued digital signals ($I_i$, $Q_i$), where i=1 to M. Hence, in an exemplary embodiment the sampling rate is equivalent to 4×1.228, or to 4.912 MHz. The sampling rate may be reduced to approximately the Nyquist rate if an interpolating filter is utilized in conjunction with the A/D converter 220.

The digital signals ($I_i, Q_i$) are supplied to a beam-forming network 224 operative to produce a set of N digital beam signals $B_z$, where z=1 to N and N=(L)(M). Each of the N beam signals $B_z$ is formed in the following manner:

$$B_z = \sum_{i=1}^{M} (I_i + jQ_i) g_{iz}$$

wherein each weighting coefficient $g_{iz}$ comprises a complex-valued number. As is described below, the weighting coefficients $g_{iz}$ are selected such that each beam signal $B_z$ corresponds to a desired receive antenna pattern produced by the M-element antenna array. The shape and direction of the antenna beam associated with each signal $B_z$ can be changed in an adaptive manner by dynamically varying the complex values of the weighting coefficients $g_{iz}$. In addition, the parameter L may be chosen to enable a desired degree of overlap between the antenna beams associated with selected sets of the signals $B_z$. For example, when L is larger than unity the antenna beams associated with certain combinations of the beam signals $B_z$ will necessarily overlap in space.

Each of the digital beam signals $B_z$, z=1 to N, are provided to a plurality of channel units, one of which is shown in FIG. 5A. Each channel unit performs the remaining signal processing and detection functions for a single communications link (e.g., a telephone call) between a mobile subscriber terminal and the base station. In response to beam selection information provided by controller 244, a switch matrix 228 within each channel unit selects a subset of the beam signals $B_z$ for processing by the channel unit. One or more search receivers 227 is utilized to identify the strongest signal received from the mobile subscriber unit associated with the channel unit. That is, the searcher receiver(s) 227 will typically be operative to measure the strength of the various multipath components arriving at the base station at different times, after having traveled correspondingly different distances, subsequent to transmission by the mobile subscriber unit. In a preferred embodiment, J sets of one or more beam signals are selected by the switch matrix 228 for processing by a set of J correlation receivers 230. This selection is based upon the search results provided to controller 244 by the searcher receiver(s) 227. That is, controller 244 determines which of the beam signals $B_z$ are to be provided to each correlation receiver 230, and which of the multipath signal components from each mobile subscriber unit are to be processed. The controller 244 may also operate to adjust the weighting coefficients within the beam-forming network 224, which alters the shape and/or direction of the beam pattern resulting from the beam signals $B_z$. The antenna beam pattern will typically be formed so as to be of maximum gain in those directions from which are received the highest concentration of mobile unit signal transmissions. Alternatively, a sufficiently large number of beams could be formed within the beam-forming network 224 to allow the beam pattern associated with each channel unit to be "custom-tailored" as required by particular applications.

Referring again to FIG. 5A, the demodulated signals produced by each correlation receiver 230 are provided to a combiner module 235. Within combiner module 235 the demodulated signals are combined, and provided to a deinterleaver and decoder network (not shown). In an exemplary embodiment the deinterleaved signals are decoded in accordance with a Viterbi decoding algorithm, and are subsequently provided to a vocoder or other functional unit.

Figure 5B:
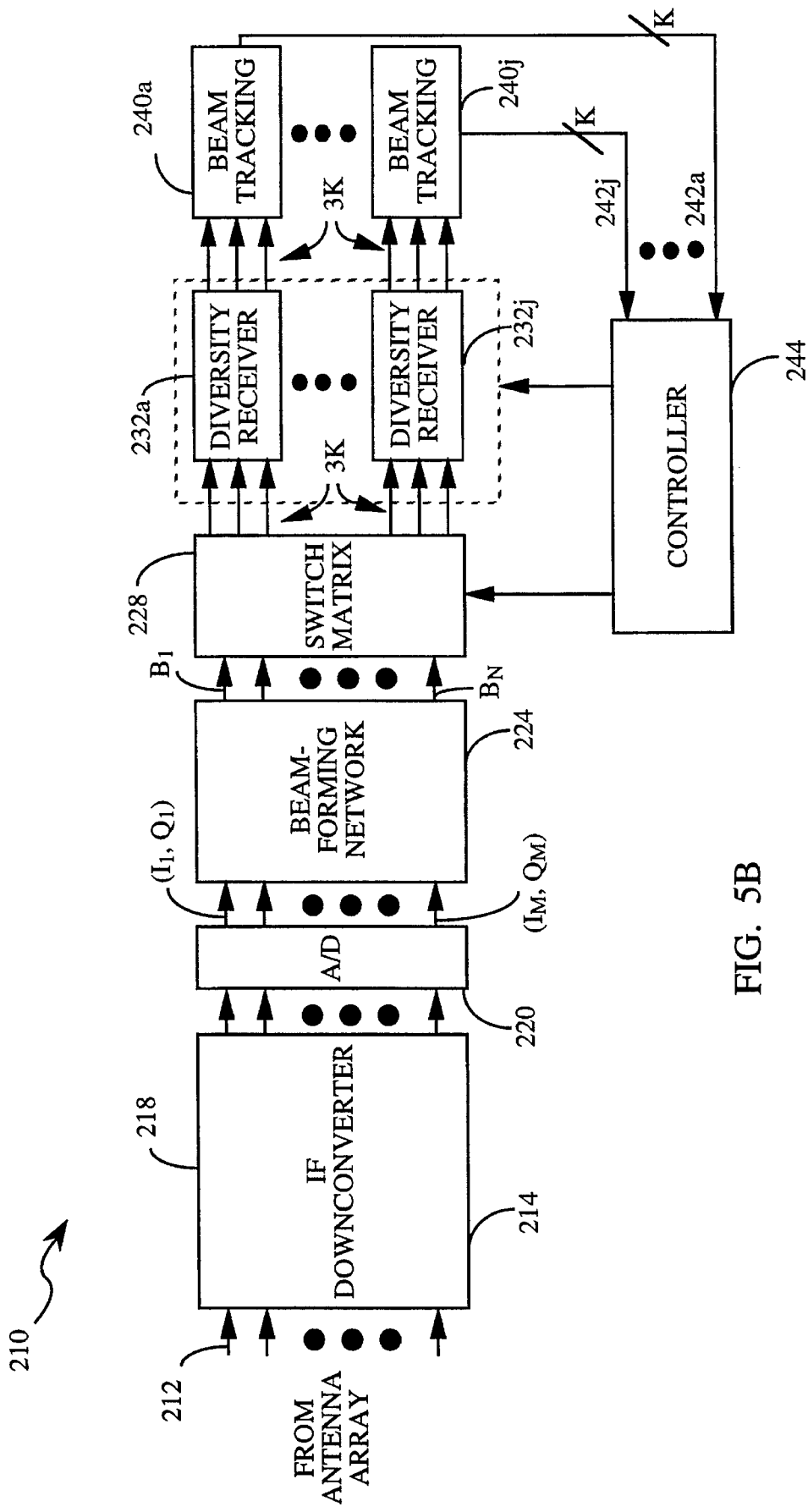
FIG. 5B shows a block diagram of a station receive network in which is included a particular channel unit implementation.

Referring now to FIG. 5B, there is shown a block diagram of the base station receive network 210 in which is included a particular channel unit implementation. The digital beam signals $B_z$, z=1 to N, are produced by beam-forming network 224 in substantially the same manner as described above with reference to FIG. 5A. The digital beam signals $B_z$, z=1 to N, are again provided to the switch matrix 228 of a selected channel unit, which is designed to allocate sets of the beam signals $B_z$ to a set of J diversity receivers 232a–232j respectively included within the correlation receivers 230. Each switch matrix 228 comprises a unidirectional circuit designed to connect the N=(L)(M) beam signal inputs to a set of P=J*3K outputs. The P outputs of the switch matrix 228 are subdivided into a set of J traffic channels associated with the diversity receivers 232a–232j, where each of J users are assigned to one of the J traffic channels (i.e. to one of the J channel units). In an exemplary embodiment each of the diversity receivers 232 is operative to process the signals received over a set of K-1 transmission paths from a particular subscriber, where K denotes the number of receiver "fingers" of each diversity receiver 232. As is described below, one of the receiver fingers of each receiver 232 will generally be dedicated to search for the strongest signal received from a specified subscriber unit.

Each "finger" element constitutes a complete demodulating receiver, which includes phase and time tracking circuits for demodulating a selected temporal component of a time-dispersed multipath signal received thereby. As is described in U.S. Pat. No. 5,109,390, entitled DIVERSITY RECEIVER IN A CDMA CELLULAR TELEPHONE SYSTEM, assigned to the assignee of the present invention, the disclosure of which is herein incorporated by reference, an diversity RAKE receiver may be comprised of one or more such receiver fingers. In an exemplary embodiment of the present invention, each traffic channel is serviced by a three-finger RAKE receiver deployed in the mobile station and by a four-finger RAKE receiver in the base station. It is noted that additional "searcher" PN correlation circuits will typically be used to identify and measure, but generally not to track in time and/or phase, certain pilot and control signals exchanged over active communication channels.

The signals propagating over the K-1 transmission paths associated with each subscriber unit comprise the information carried by the "traffic channel" assigned to each subscriber unit. In a preferred embodiment at most 3K of the beam signals $B_z$ are assigned to each traffic channel. That is, a subset of three adjacent antenna beams are used to receive the multipath signal processed by a given receiver finger. If two or more multipath signals assigned to different receiver fingers are proximately located in space, the same 3-beam subset may be assigned to receive each of the two or more signals. In this case less than 3K beam signals would be assigned to the traffic channel.

Referring to FIG. 5B, the allocation of three beams used to receive each separately incident signal enables beam tracking networks 240a–240j to spatially track each received signal. For example, assume that the $j^{th}$ beam produced by the base station antenna array has been identified as carrying the strongest signal of the three antenna beams associated with a given receiver finger. Spatial tracking may then be accomplished, as is described in detail below, by computing a spatial tracking signal on the basis of the energy difference in the "right" and "left" adjacent antenna beams (i.e., beams j±1). Each of the resultant K spatial tracking signals from each of the beam-tracking networks 240a–240j are carried by an associated tracking bus 242a–242j to a controller 244. Each tracking bus 242a–242j is comprised of a set of K signal lines corresponding to the K fingers of each diversity receiver 232a–232j. If the tracking signals indicate that the signal received through the "right" beam j+1 is significantly stronger than the signal received by way of "left" beam j−1, then controller 244 may improve signal reception by instructing the switch matrix 228 to alter the set of beams allocated to the given receiver finger from j, j±1 to j, j+1, j+2.

In a preferred implementation, the timing of the demodulation of signals received over the right and left beams of a given finger is offset by a predetermined margin. That is, the timing of the demodulation of the signals carried by the right and left beams (i.e., beams j±1) is offset such that one of the beams j±1 is designated the "early" beam, while the other is designated as the "late" beam. Each of the beam-tracking networks 240a–240j produces a tracking signal based on energy difference between the signals received over the right and left beams associated with each receiver finger. For example, again assume that the beams j, j±1 produced by the base station antenna array correspond to the three antenna beams associated with a given receiver finger. A tracking signal, supplied by the associated tracking bus 242a–242j to controller 244, is computed on the basis of the energy difference in the demodulated signals obtained from the right and left beams (i.e., beams j±1). Demodulation timing within the associated diversity receiver 232a–232j is then adjusted accordingly by the controller 244.

Figure 5C:
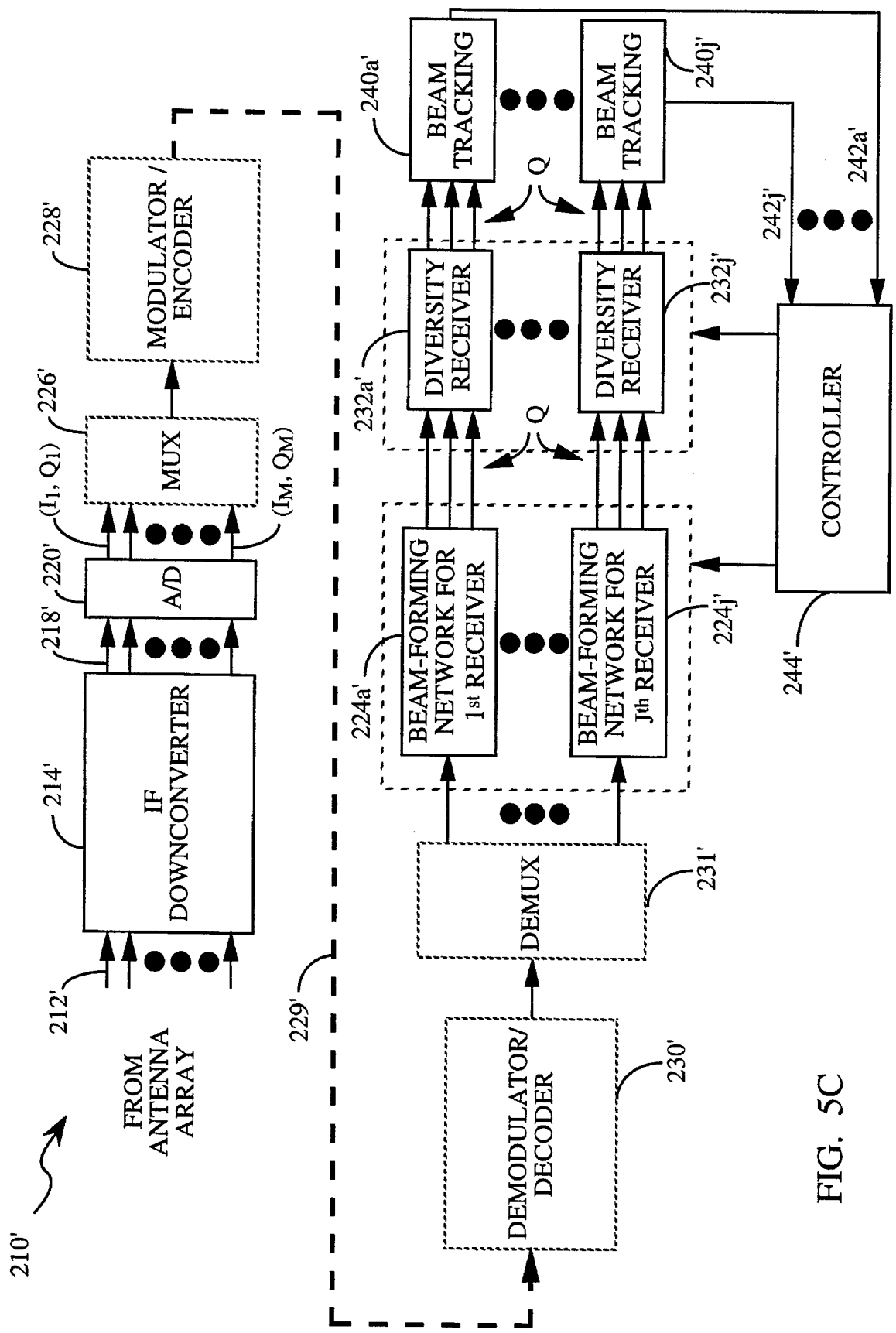
FIG. 5C shows a block diagram of a base station receive network including an antenna array deployed at a remote location.

FIG. 5C shows a block diagram of a base station receive network 210' including an antenna array deployed at a remote location. Referring to FIG. 5C, an M-element antenna array (not shown) is seen to provide a set of received signals over M signal lines 212'. In the exemplary embodiment the antenna array comprises a number (M) of omnidirectional antenna elements uniformly arranged about a circular periphery, thereby enabling the reception of signals incident from any direction.

In alternate embodiments the M-element antenna array could be replaced by a rectangular grid of M-omnidirectional antenna elements. The weighting coefficients associated with each element in the grid could then be selected to allow the formation of beams in any direction. In the general case, arbitrary configurations of antenna elements could be used to form beams in any direction by employing appropriate beam forming circuitry in conjunction with pre-computed tables of weighting coefficients.

As is shown in FIG. 5C, the signal lines 212' from the antenna array are connected to an IF downconverter 214' operative to downconvert the received signals to a set of IF signals 218'. The IF signals 218' are then sampled within an analog to digital (A/D) converter 220' so as to produce a set of M complex-valued digital signals $(I'_i, Q'_i)$, where i=1 to M. In the preferred embodiment the sampling rate of the A/D converter 220' is selected to be approximately four times the PN spreading rate. Hence, in an exemplary embodiment the sampling rate is equivalent to 4×1.228, or to 4.912 MHz. The sampling rate may be reduced to the Nyquist rate if an interpolating filter is utilized in conjunction with the A/D converter 220'.

The digital signals $(I'_i, Q'_i)$, i=1 to M, are optionally converted by multiplexer 226' to a serial stream, and are provided to a modulator/encoder 228'. In the embodiment of FIG. 5C the antenna array, A/D converter 220', multiplexer 226' and modulator/encoder 228' are situated at a site remote from the signal processing elements of the receive network 210'. Information from the remote location is provided over a communication link 229' (e.g., an optical fiber) to a demodulator/decoder network 230' located at a central processing location or base station. The modulator/encoder 228' operates to modulate and encode the information from the remote location so as to ensure reliable transmission over the communication link 229'. It will be appreciated that the specific modulation and encoding format employed will be dependent upon the characteristics of the communication link 229'. It will further be appreciated that this modulation and encoding is performed solely to enhance the integrity of data transmission from the remote site. Accordingly, the optional inclusion of circuit elements 226'–231' is indicated by depicting these elements in phantom in FIG. 5C.

The demodulated and decoded signal produced by the demodulator/decoder 230' is then distributed by demultiplexer 231' to a set of J beam-forming networks 224a'–224j'. Each beam-forming network 224a'–224j' generates, as described above, a set of Q beam signals for processing by a corresponding diversity receiver 232a'–232j'. The parameter Q is equivalent to the product of:

(i) the number of "fingers" of each diversity receiver 232a'–232j', and (ii) the number of beams assigned to each finger. In the preferred embodiment a subset of three adjacent antenna beams are used to receive the multipath signal processed by a given receiver finger. If two or more multipath signals assigned to different receiver fingers are proximately located in space, the same 3-beam subset may be assigned to receive each of the two or more signals. In this case less than Q/3 beam signals would be assigned to the traffic channel. This allocation of beams enables the beam tracking networks 240a'–240j' to accomplish tracking, in both time and space, of each received beam signal. This tracking is carried out substantially as described above, with the exception that controller 244' provides beam selection information separately to each beam-forming network 224a'–224j'.

Figure 5D:
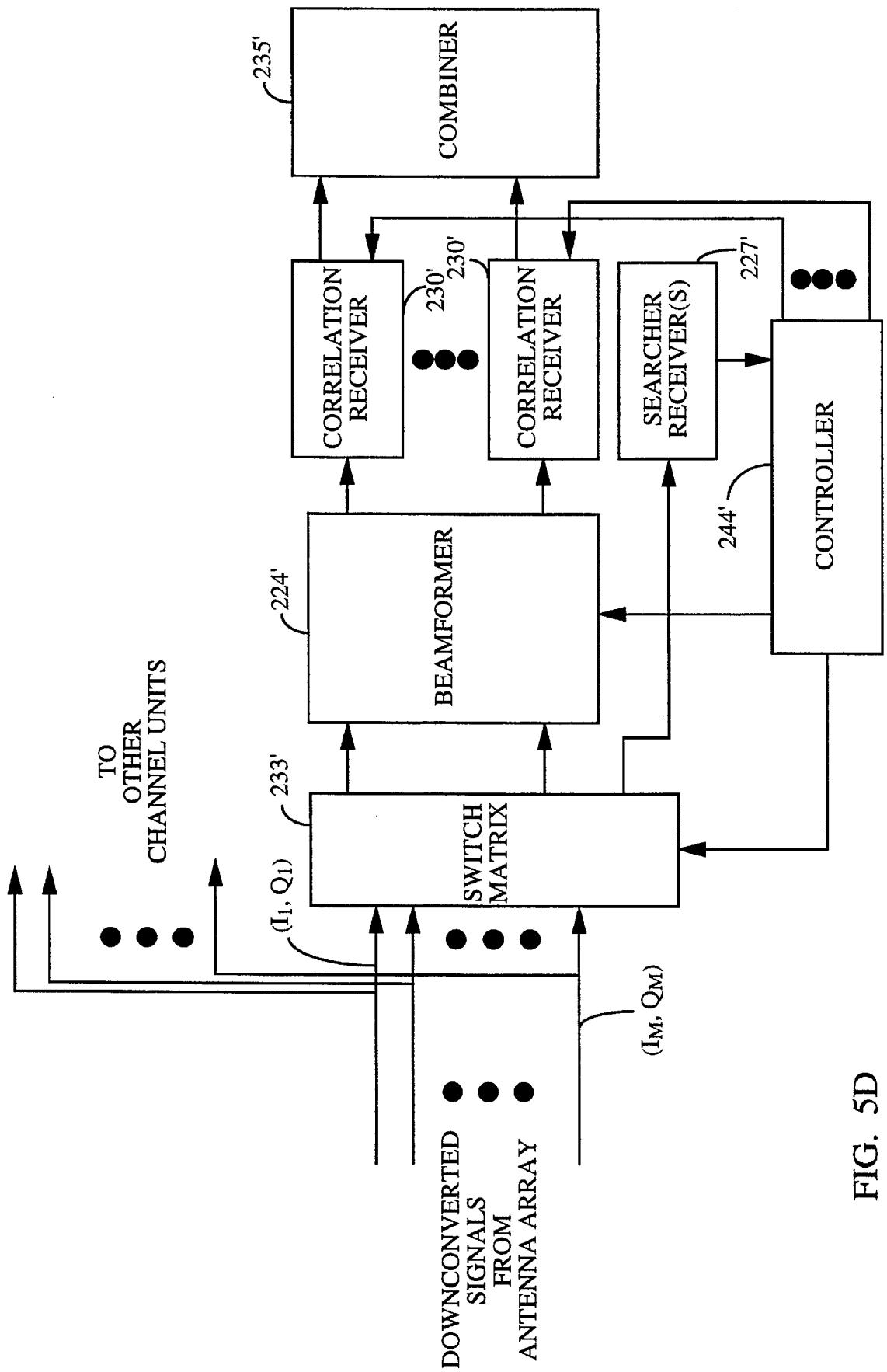
FIG. 5D depicts a block diagram of an adaptive beam RAKE receiver disposed to process a set of frequency-downconverted, digitized antenna beam signals.

Referring now to FIG. 5D, there is shown a block diagram of an adaptive beam RAKE receiver disposed to process a set of M frequency-downconverted, digitized antenna beam signals such as those output by the A/D converter 220 (FIG. 5A). The M antenna signals are distributed to a set of J channel units, one of which is shown in FIG. 5D. Each channel unit performs the remaining signal processing and detection functions for a single communications link (e.g., a telephone call) between a mobile subscriber terminal and the base station. In response to beam selection information provided by controller 244', a switch matrix 233' within each channel unit selects a subset of the M received array signals for processing by the channel unit. One or more search receiver(s) 227' are utilized to identify the strongest signal received from the mobile subscriber unit associated with the channel unit. That is, the searcher receiver(s) 227' will typically be operative to measure the strength of the various multipath components arriving at the base station at different times, after having traveled correspondingly different distances, subsequent to transmission by the mobile subscriber unit. In a preferred embodiment, J sets of one or more array signals are selected by the switch matrix 233' within each channel unit for processing by a set of J correlation receivers 230' within the channel unit. This selection is based upon the search results provided to controller 244' by the searcher receiver(s) 227'. That is, controller 244' determines which of the M signals produced by the antenna array are to be provided to each correlation receiver 230', and which of the multipath signal components from each mobile subscriber unit are to be processed.

The digitized signals from the antenna array selected by the switch matrix 233' of each channel unit are supplied to a beam-forming network 224' within the channel unit. The beam-forming network is operative to produce one or more digital beam signals for processing by each correlation receiver 230' by linearly combining the selected array signals with a set of weighting coefficients chosen to maximize signal-to-noise ratio of the strongest received multipath component processed by the receiver 230'. This will typically result in selection of the weighting coefficients to maximize beam gain in the direction of the strongest received multipath signal component, as determined by searcher receiver(s) 227'. More than a single beam may be provided to each correlation receiver 230', since the one or more multipath signal components processed by each receiver 230' will typically arrive at the base station from different directions. The shape and direction of the antenna beam associated with each beam signal can be changed in an adaptive manner by controller 244' through dynamic variation of the values of each weighting coefficient. The beams selected by other channel units (not shown in FIG. 5D) can likewise be directed so as to maximize the SNR of the signals processed by those units.

Referring again to FIG. 5D, the correlation receiver 230' of each channel unit participates in the remaining signal processing functions performed for a single communications link between a mobile subscriber terminal and the base station. The demodulated signals produced by each correlation receiver 230' are provided to a combiner module 235'. Within combiner module 235' the demodulated signals are combined, and provided to a deinterleaver and decoder network (not shown). In an exemplary embodiment the deinterleaved signals are decoded in accordance with a Viterbi decoding algorithm, and are subsequently provided to a vocoder or other functional unit. A principal advantage afforded by the embodiment of FIG. 5D is that relatively few beam signals need to be processed by the switch matrix. Although perhaps requiring that additional beam-forming elements be provided, this may nonetheless result in the most cost-effective circuit implementation.

In FIGS. 5A–5D, the width of the antenna beams assigned to a particular traffic channel will be dependent upon the distance between the associated subscriber unit and the base station. It is anticipated that beams of wider width will typically be assigned to subscriber units relatively close to the base station, while beams of narrower width will be allocated to more distant subscriber units.

C. Beam-Forming Network

Figure 6:
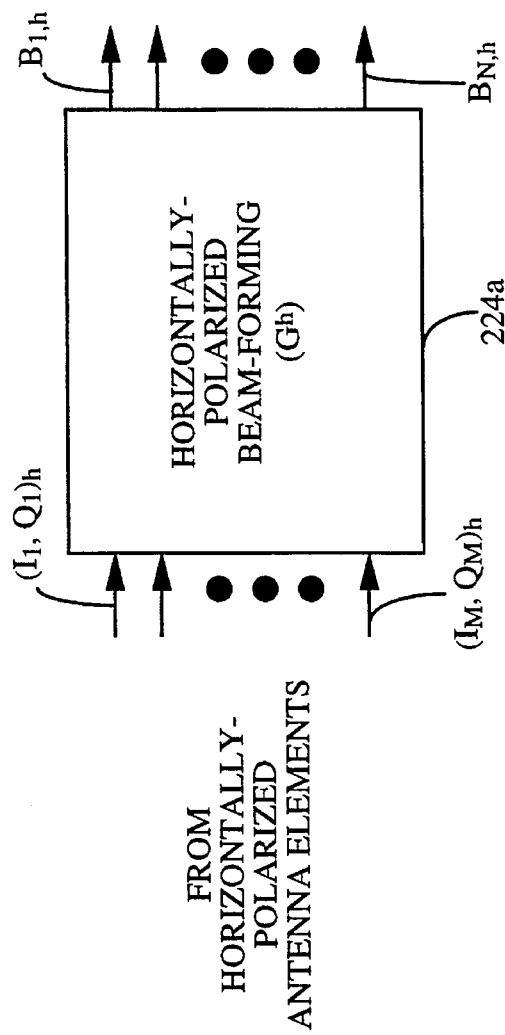
FIG. 6 shows an implementation of a receive antenna array which includes antenna elements for receiving both horizontally and vertically polarized signals.
Figure 6:
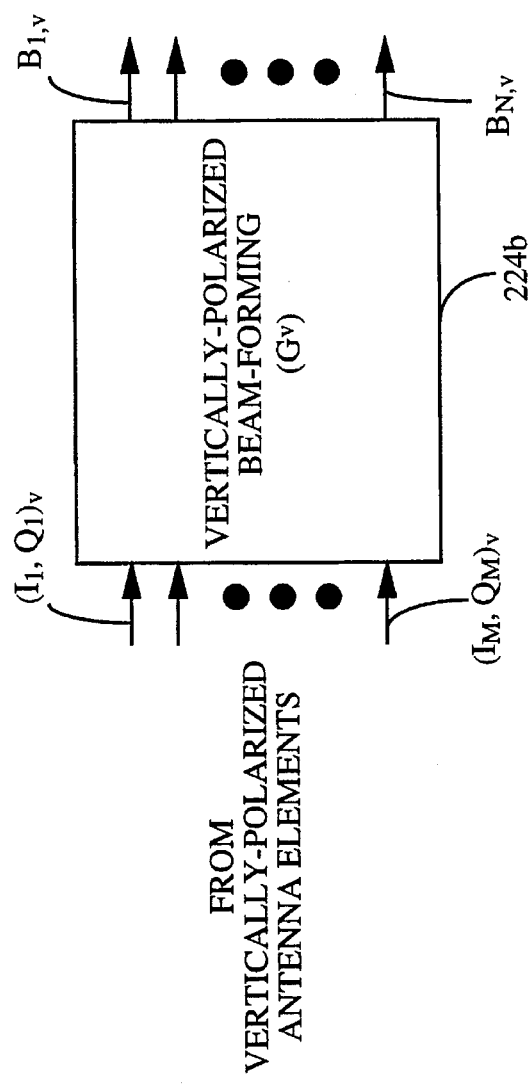

Referring to FIG. 6, the receive antenna array is alternately realized so as to include antenna elements for receiving both horizontally and vertically polarized signals $(I_i, Q_i)_h$ and $(I_i, Q_i)_v$. In such an embodiment separate beam-forming networks 224a and 224b are utilized to provide separate sets of beam-forming signals $B_{z,h}$ and $B_{z,v}$, corresponding to horizontally and vertically polarized beam patterns, respectively. The signals $B_{z,h}$ and $B_{z,v}$ are respectively generated by the beam forming networks 224a and 224b in accordance with the expressions:

$$B_{(z,H)} = \sum_{i=1}^{M} (I_i + jQ_i)_H g_{iz}$$

$$B_{(z,V)} = \sum_{i=1}^{M} (I_i + jQ_i)_V g_{iz}$$

where, as in the case of equation (1), z=1 to z=(L)(M).

In the implementation of FIG. 6 both of the sets of beam signals $B_{(z,h)}$ and $B_{(z,v)}$ could be processed by the same switch matrix. In addition, although the $i^{th}$ pair of beam signals $B_{(z,h)i}$ and $B_{(z,v)i}$ will generally not be allocated to the same finger of a receiver associated with a particular traffic channel, each signal could be separately used by a different finger of a given receiver. Additional details relating to implementation of selective polarization as contemplated by the array realization of FIG. 6 are described in, for example, the above-referenced U.S. Pat. No. 4,901,307.

D. Switch Matrix

In the following description of the switch matrix 228 (FIG. 5A), it is assumed that the antenna beams associated with successive beam signals $B_i$ and $B_{i+1}$ are spatially adjacent. In the general case (L>1), each pair of adjacent beams (i.e., $B_i$ and $B_{i+1}$) will overlap in space. Referring to FIG. 5A, the J traffic channels supported by the P=J*3K outputs of switch matrix 228 may be identified using the notation $T_{j,k,m}$. In particular, the first subscript, j, may assume the values 0, 1, . . . , J-1, and specifies one of the J traffic channels. The second subscript, k, identifies a particular transmission path (i.e., finger) of the traffic channel and assumes the value 0, 1, . . . , K-1. The third subscript, m, where m=0, 1 or 2 identifies one of the three adjacent antenna beams assigned to a particular traffic channel finger.

In an exemplary embodiment the input beam signals $B_i$ are assigned to the switch matrix traffic channel outputs $T_{j,k,m}$ in accordance with the following:

1) For every traffic channel $T_j$ each of the 3K outputs associated therewith are linked to a different input beam $B_i$. In addition, the set of input beam signals $B_i$ connected to a given traffic channel will generally be comprised of K groups, each group including a set of three spatially adjacent beams. For example, if K=3, (i.e., 3 channel fingers), then a set of beams $B_{i-1}$, $B_i$, $B_{i+1}$, $B_j$, $B_{j+1}$, $B_{k-1}$, $B_k$, and $B_{k+1}$ are connected to the traffic channel in question.

2) Each input beam signal $B_i$ may be connected to one or more traffic channels. However, if a beam signal $B_i$ is supplied to a given traffic channel it is provided to one and only one switch matrix output assigned to that channel.

3) The connections between the input beam signals $B_i$ and the traffic channel outputs $T_{j,k,m}$ may be described by a matrix having M rows corresponding to the beams signals $B_i$, i=1, 2, . . . M, and having P=J*3K columns corresponding to the switch matrix traffic channel outputs. The entry at the $m^{th}$ row and $p^{th}$ column of the matrix is designated to be "1" if the input beam signal $B_m$ is to be connected to the specified traffic channel output $T_{j,k,m}$. The entry is made to be "0" if such a connection does not exist. An exemplary connection matrix for the case of nine input beam signals (M=9), four traffic channels (J=4), and one finger per traffic channel (K=1) is set forth below in TABLE I. Note that TABLE I specifies that beam signals $B_1$, $B_2$, and $B_3$ are to be connected to traffic channel "0" (i.e., $B_1$ to $T_{0,0,1}$, $B_2$ to $T_{0,0,2}$, and $B_3$ to $T_{0,0,0}$), beam signals $B_3$, $B_4$, and $B_5$ are to be connected to traffic channel "1" (i.e., $B_3$ to $T_{1,0,0}$, $B_4$ to $T_{1,0,1}$, and $B_5$ to $T_{1,0,2}$), beam signals $B_7$, $B_8$, and $B_0$ are to connected to be traffic channel "2" (i.e., $B_7$ to $T_{2,0,2}$, $B_8$ to $T_{2,0,2}$, and $B_0$ to $T_{2,0,0}$), and beam signals $B_5$, $B_6$, and $B_7$ are to be connected to traffic channel "3" (i.e., $B_5$ to $T_{3,0,2}$, $B_6$ to $T_{3,0,0}$, and $B_7$ to $T_{3,0,1}$).

TABLE I

| | $T_{0,0,0}$ | $T_{0,0,1}$ | $T_{0,0,2}$ | $T_{1,0,0}$ | $T_{1,0,1}$ | $T_{1,0,2}$ | $T_{2,0,0}$ | $T_{2,0,1}$ | $T_{2,0,2}$ | $T_{3,0,0}$ | $T_{3,0,1}$ | $T_{3,0,2}$ |
|---|---|---|---|---|---|---|---|---|---|---|---|---|
| $B_0$ | 0 | 0 | 0 | 0 | 0 | 0 | 1 | 0 | 0 | 0 | 0 | 0 |
| $B_1$ | 0 | 1 | 0 | 0 | 0 | 0 | 0 | 0 | 0 | 0 | 0 | 0 |
| $B_2$ | 0 | 0 | 1 | 0 | 0 | 0 | 0 | 0 | 0 | 0 | 0 | 0 |
| $B_3$ | 1 | 0 | 0 | 1 | 0 | 0 | 0 | 0 | 0 | 0 | 0 | 0 |
| $B_4$ | 0 | 0 | 0 | 0 | 1 | 0 | 0 | 0 | 0 | 0 | 0 | 0 |
| $B_5$ | 0 | 0 | 0 | 0 | 0 | 1 | 0 | 0 | 0 | 0 | 0 | 1 |
| $B_6$ | 0 | 0 | 0 | 0 | 0 | 0 | 0 | 0 | 0 | 1 | 0 | 0 |
| $B_7$ | 0 | 0 | 0 | 0 | 0 | 0 | 0 | 1 | 0 | 0 | 1 | 0 |
| $B_8$ | 0 | 0 | 0 | 0 | 0 | 0 | 0 | 0 | 1 | 0 | 0 | 0 |

Figure 7:
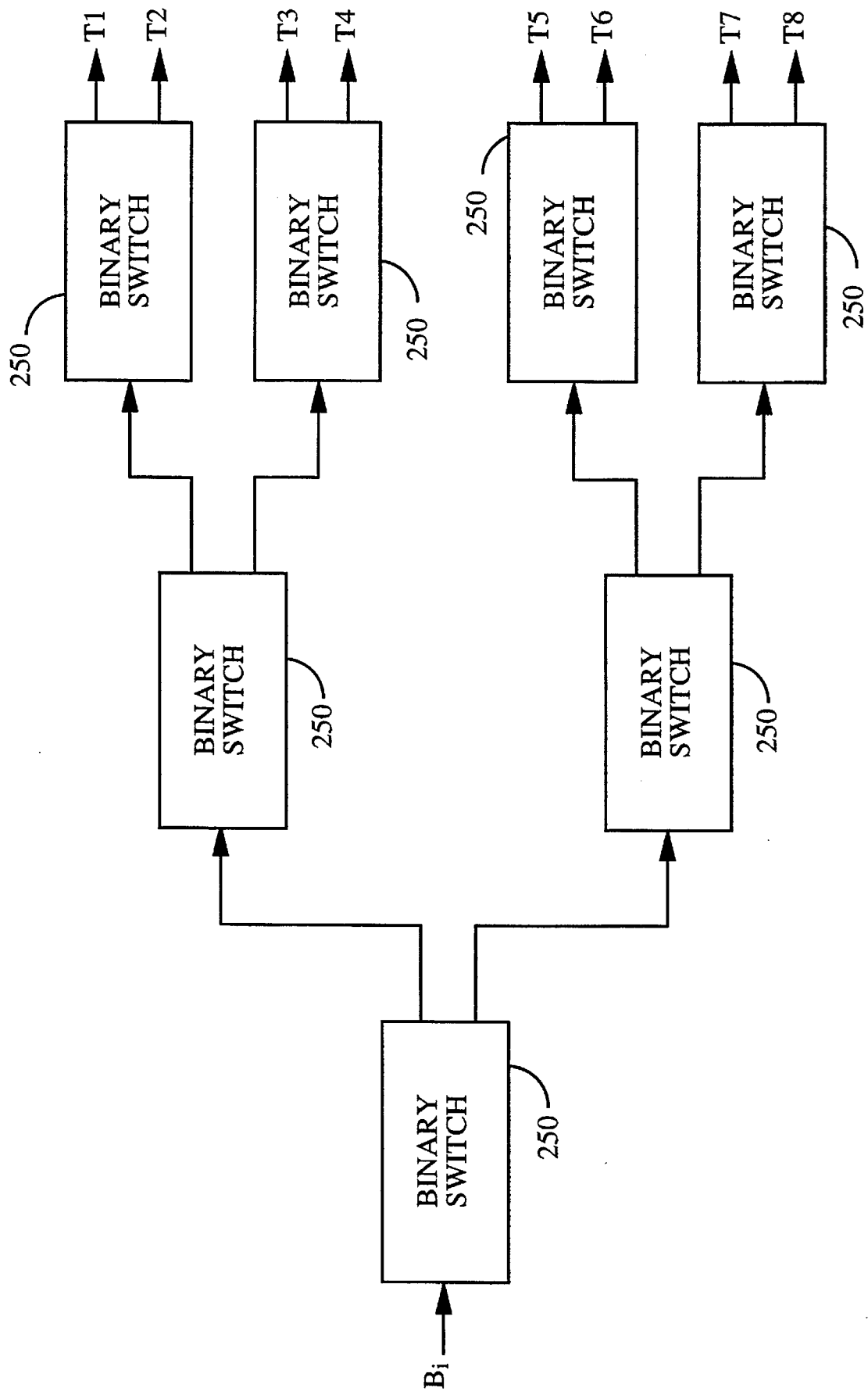
FIG. 7 shows an arrangement of switches included within a switch matrix for providing exactly one signal path between a given input beam signal and each output traffic channel.

In a preferred implementation of the switch matrix 228, each beam signal is capable of being connected to each and every of the traffic channel outputs $T_{j,k,m}$. Referring to FIG. 7, there is shown a tree-like arrangement of switches 250 designed to provide exactly one signal path between the beam signal $B_i$ and each traffic channel. Each switch 250 will preferably be comprised of a one-input, two-output binary switch capable of being toggled between four states (e.g., states S0–S3). In state S0 the switch input is isolated from both outputs, in state S1 the input is connected only to the first output, in state S2 the input is connected only to the second output, and in state S3 the input is connected to both outputs.

As noted above, each input beam signal is to be connected to at most one of the 3K lines associated with each traffic channel. Accordingly, the tree-like switch arrangement of FIG. 7 allows the beam signal $B_i$ to be connected to any combination of a set of eight traffic channels T1–T8. By arraying a set of N switch trees a switch matrix is realized which is capable of connecting a set of N input beam signals to a set of traffic channels T', where T' denotes the number of outputs provided by each switch tree. In general, each switch tree will include (T'–1) binary switches.

E. Diversity Receiver

Figure 8:
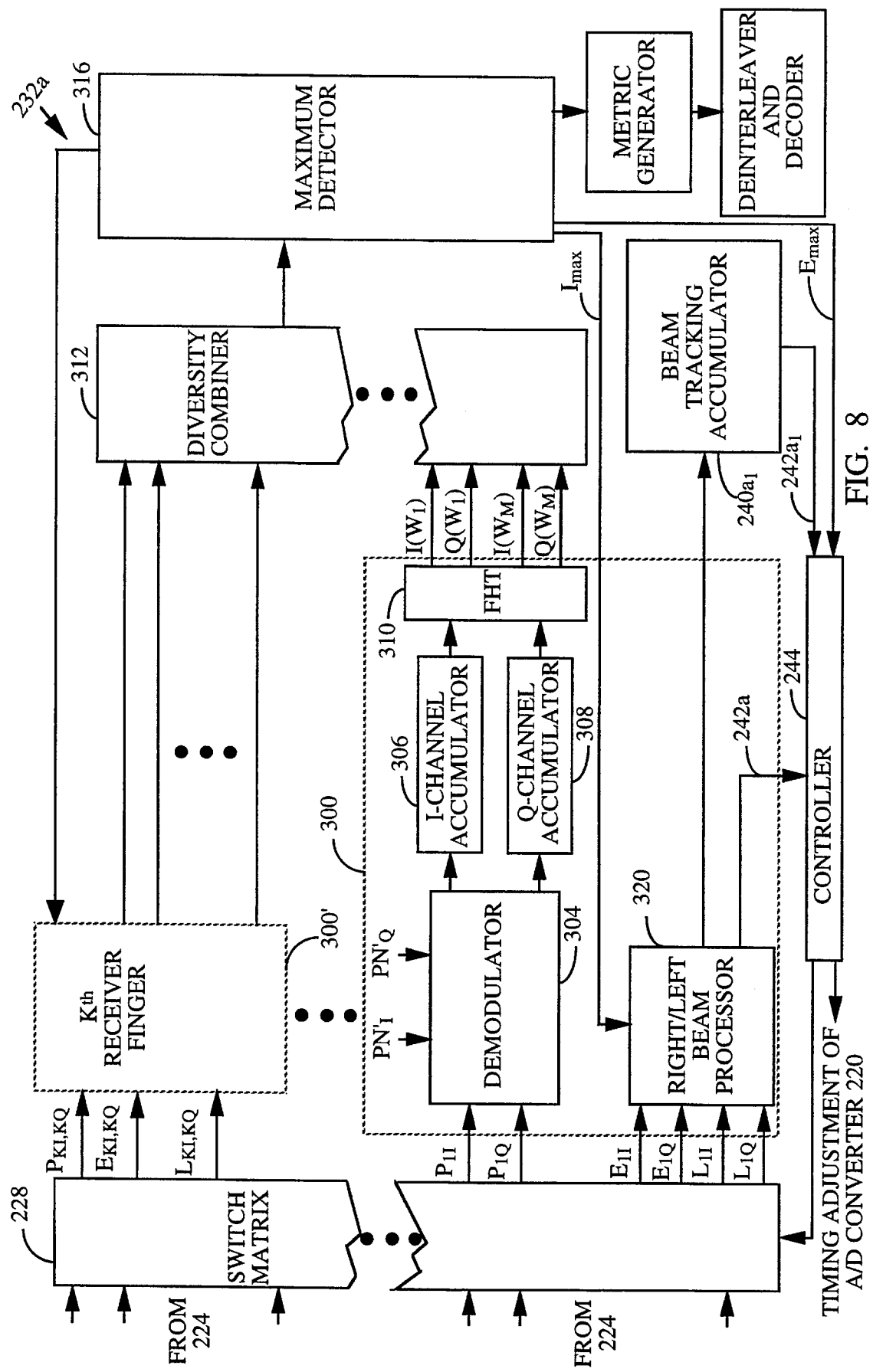
FIG. 8 is a block diagram of an exemplary diversity receiver included within a base station receive network.

FIG. 8 is a block diagram of the diversity receiver 232a, it being understood that the diversity receivers 232b–232j may be implemented in a substantially identical manner. In the preferred embodiment the switch matrix 228 serves to provide the receiver 232a with a set of 3K beam signals associated with a particular traffic channel. The three beam signals associated with the K transmission paths of the received traffic channel are each processed by one of K receiver fingers, with the first and $K^{th}$ such fingers within the receiver 232a being respectively identified using the reference numerals 300 and 300'. Although only the first receiver finger 300 is shown in detail in FIG. 8, each of the remaining K-1 receiver fingers are assumed to be substantially identical thereto.

As is indicated by FIG. 8, switch matrix 228 provides I and Q components of Right ($R_{1I}$, $R_{1Q}$), Left ($L_{1I}$, $L_{1Q}$) and Center ($C_{1I}$, $C_{1Q}$) beam signals to the first receiver finger 300. The switch matrix 228 also provides I and Q components of Right, Left and Center beam signals to the remaining K-1 receiver fingers, as is exemplified by the Right ($R_{KI}$, $R_{KQ}$), Left ($L_{KI}$, $L_{KQ}$) and Center ($C_{KI}$, $C_{KQ}$) beam signals supplied to the $K^{th}$ receiver finger 300'.

Referring to FIG. 8, the Center ($C_{1I}$, $C_{1Q}$) beam signals are provided to an offset OQPSK demodulator 304 along with locally-generated replicas ($PN_I'$ and $PN_Q'$) of the sequences $PN_I$ and $PN_Q$. The resultant I and Q channel decorrelated outputs from demodulator 304 are accumulated within I-channel and Q-channel buffer accumulators 306 and 308, which each accumulate symbol data over an interval equivalent to four PN chips in duration. The outputs of the accumulators 306 and 308 are latched by a Fast Hadamard Transform (FHT) processor 310 at the conclusion of each accumulation interval.

As noted above, in 64-ary Walsh signaling the transmitted symbols are encoded into one of 64 different binary sequences known as Walsh functions. In an exemplary implementation the signals from each subscriber unit 12 are modulated by the same set of 64 orthogonal Walsh code sequences of length 64. It is well known that the Fast Hadamard Transform operation implemented by the FHT processor 310 provides a convenient mechanism for correlating the received signal energy with each of the 64 available Walsh sequences.

In particular, the FHT processor 310 operates to produce a set of 64 I-channel "hypotheses" I(W1), I(W2), . . . I(W64), and 64 Q-channel "hypotheses" Q(W1), Q(W2), . . . Q(W64), based on the results of each of the 64 correlations performed therein during each processing slot. A diversity combiner 312 is disposed to receive the 64 parallel I-channel outputs, as well as the 64 parallel Q-channel outputs, produced by the FHT processor of each receiver finger during each processing slot. In the exemplary implementation, the I and Q channel outputs produced by the FHT processor within a given finger are weighted within the diversity combiner 312 in proportion to an average signal energy received over the transmission path associated with the finger. In such an implementation the signal power produced by the FHT processor of each finger will typically be monitored over successive intervals, each of which span several received symbol periods (e.g., a processing slot of six symbol periods). The relative weight assigned to each finger by the diversity combiner 312 may then be adjusted at the conclusion of each monitored interval.

Based on the weighted I and Q channel outputs produced by the FHT processors of each receiver finger, the diversity combiner 312 provides a parallel set of 64 Walsh energy signals to a maximum detector block 316. The maximum detector block 316 identifies which of the 64 Walsh sequences produced by the diversity combiner 312 is of the largest energy, i.e., is of the energy $E_{max}$. The magnitude of the energy $E_{max}$ may be provided to controller 244 within which it may be employed during the next processing slot for power control and lock detection functions. The maximum detector block 316 also produces a Walsh index $I_{max}$, where $I_{max} \in \{1, 2, \ldots, 64\}$, corresponding to the selected Walsh sequence of energy $E_{max}$. As is described below with reference to FIG. 9, the Walsh index $I_{max}$ specifies which one of the 64 Walsh sequences will be used within a right/left beam processor 320 to demodulate the Right and Left Beam signals $R_{1I}$, $R_{1Q}$, $L_{1I}$, and $L_{1Q}$.

Figure 9:
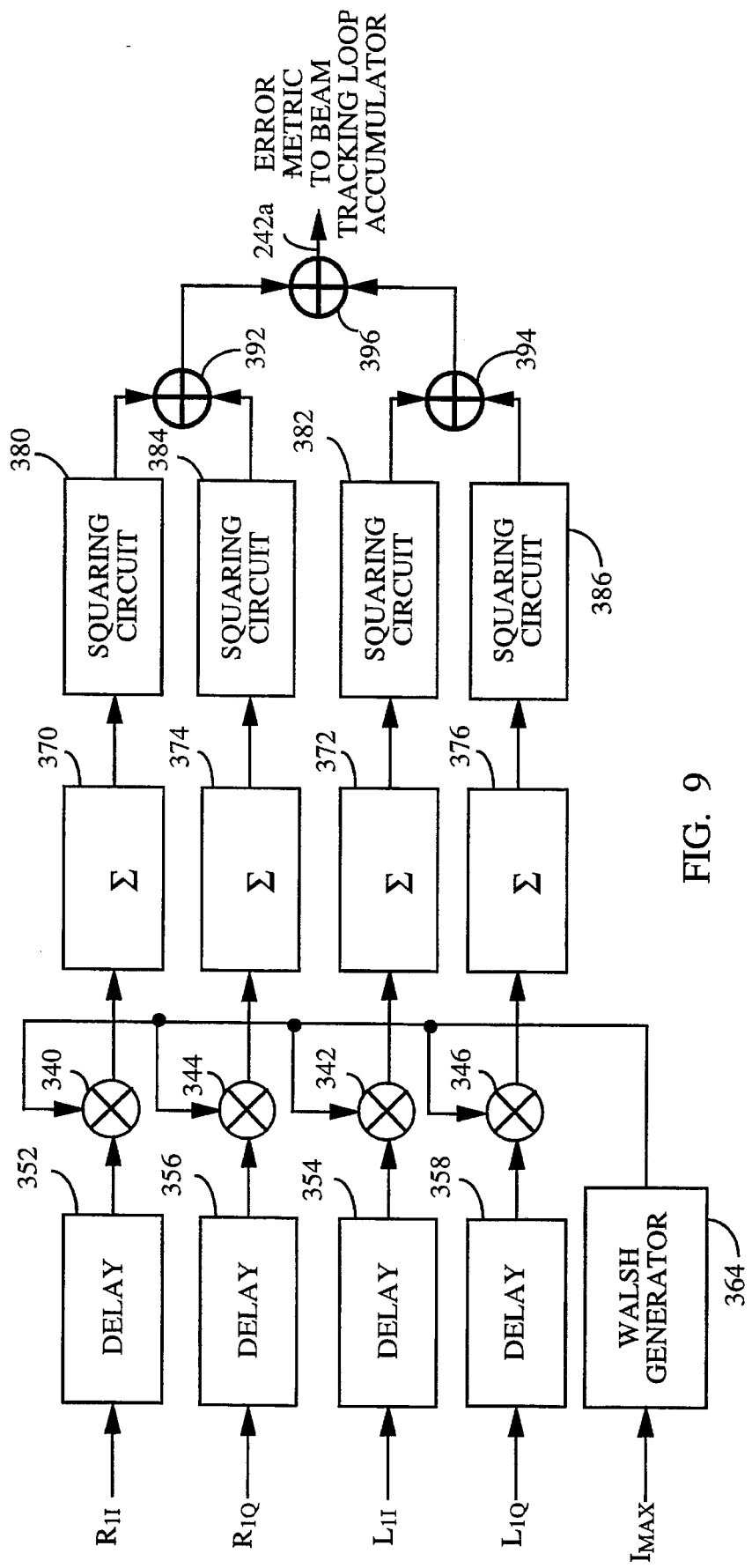
FIG. 9 provides a detailed representation of a right/left beam processor.

FIG. 9 provides a more detailed representation of the right/left beam processor 320. As shown in FIG. 9, the beam processor 320 includes I-channel multipliers 340 and 342, and also includes Q-channel multipliers 344 and 346. The I-channel multipliers 342 and 344 are supplied with I-channel samples of the right ($R_{1I}$) and left ($L_{1I}$) beam signals via delay elements 352 and 354. Similarly, the Q-channel multipliers 344 and 346 are provided with Q-channel samples of the right ($R_{1Q}$) and left ($L_{1Q}$) via delay elements 356 and 358. The delay elements 352, 354, 356 and 358 function to delay the I and Q components of the right and left beam signals pending identification of the Walsh index $I_{max}$. In an exemplary embodiment, logical high and low values of +1 and −1 are supplied by the delay elements to the multipliers 340, 342, 344 and 346.

Referring to FIG. 9, a Walsh symbol generator 364 is operative to provide the multipliers 340, 342, 344 and 346 with the Walsh sequence comprising the Walsh symbol identified by the index $I_{max}$. The sequence identified by the index $I_{max}$ is multiplied with the I-channel samples of the right ($R_{1I}$) and left ($L_{1I}$) beam signals, and also with the Q-channel samples of the right ($R_{1Q}$) and left ($L_{1Q}$) beam signals. The resultant demodulated outputs of multipliers 340 and 342 are then respectively provided to I-channel saturating accumulators 370 and 372, and the demodulated outputs of multipliers 344 and 346 are respectively provided to Q-channel saturating accumulators 374 and 376. Saturating accumulators 370, 372, 374 and 376 accumulate the input information over a period spanning "q" Walsh chips. In a preferred implementation each accumulation is performed over 64 Walsh chips (q=64), i.e., over a Walsh symbol period. The q-bit I-channel accumulator outputs are provided to I-channel squaring circuits 380 and 382, and the q-bit Q-channel accumulator outputs are provided to Q-channel squaring circuits 384 and 386.

An estimate of the energy of the right beam is obtained by combining the I and Q channel outputs of the squaring circuits 380 and 384 within a summer 392. Similarly, the left beam energy is estimated by combining the I and Q channel outputs of the squaring circuits 382 and 386 within a summer 394. A beam error signal is then produced by digital difference circuit 396 based on the difference between right and left beam energies produced by summers 392 and 394, respectively. The sign and magnitude of the beam error signal are dependent upon the results of the left and right beam Walsh demodulations respectively performed by the pairs of multipliers 342, 346 and 340, 344. For example, if the sampling phase of the A/D converter (FIG. 5A) is set such that the magnitude of the left beam Walsh demodulation exceeds the magnitude of the right beam Walsh demodulation, then the beam error signal will be positive. Similarly, when the magnitude of the right beam Walsh demodulation exceeds the magnitude of the left beam Walsh demodulation, then the beam error signal will be negative.

The tracking signal produced by a given receiver finger facilitates adjustment of the set of beams assigned to the given finger. As was previously noted, the switch matrix 228 functions to allocate a set of three adjacent beams (e.g., $B_{i-1}$, $B_i$, and $B_{i+1}$) to each receiver finger. In accordance with the invention, the beam tracking network 240 (FIG. 5B) associated with a particular diversity receiver 232 provides beam switching signals to controller 244 on the basis of the tracking signals received from each finger of the receiver 232. As a consequence, controller 244 may periodically instruct switch matrix 228 to shift the beaming direction of a given finger by one beam width. For example, if a given finger had previously been allocated beams $B_{i-1}$, $B_i$, and $B_{i+1}$, it may be switched to beams $B_i$, $B_{i+1}$, and $B_{i+2}$ in response to generation of a specific beam switching signal. In this way each receiver finger is made to spatially track the incident multipath signal to which it has been assigned.

Referring again to FIG. 8, the beam tracking network 240a includes a set of beam tracking accumulators $240a_i$, i=1 to K, associated with each of the K receiver fingers of the diversity receiver 232a. Each beam tracking accumulator $240a_i$ processes the beam error signal produced by the right/left beam processor within the receiver finger associated therewith. As is described below with reference to FIG. 11, under certain conditions the beam error signal produced within a particular finger of receiver 232a will be used to increment/decrement an accumulation register within the corresponding beam tracking accumulator $240a_1$. When the accumulation register overflows/undertows, a beam switching signal is provided to controller 244, and the set of beams allocated to the receiver finger by switch matrix 228 is adjusted accordingly.

Figure 10:
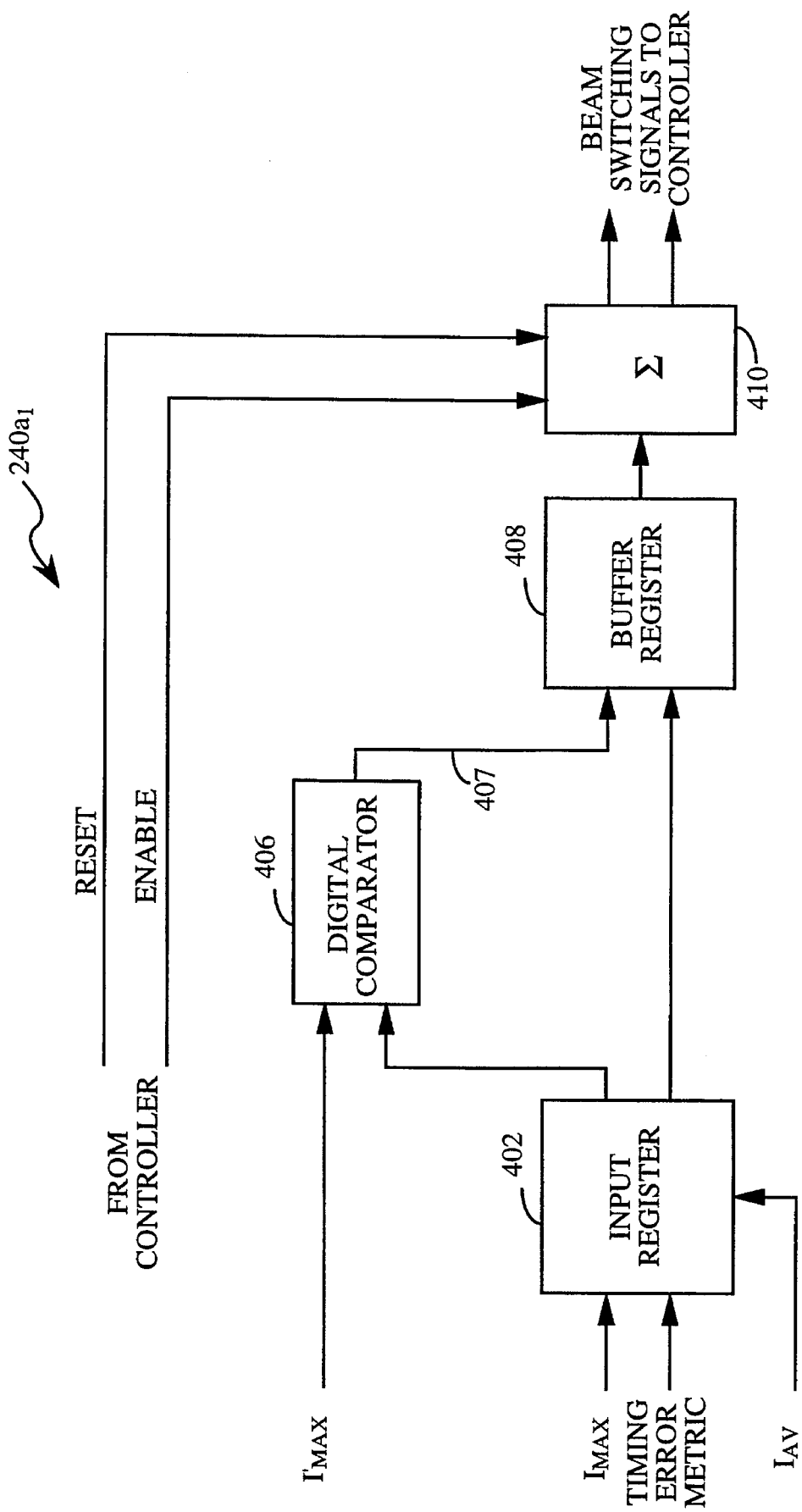
FIG. 10 shows a block diagram representation of a beam tracking accumulator associated with a first receiver finger of an exemplary diversity receiver.

Turning now to FIG. 10, them is shown a block diagram representation of the beam tracking accumulator $240a_1$ associated with the first receiver finger 300 (FIG. 8) of diversity receiver 232a. The beam tracking accumulator $240a_1$ includes an input register 402 to which is provided the Walsh symbol hypothesis index $I_{max}$ generated by maximum detector block 316, and the beam error signal from the right/left beam processor 320. These values are stored within register 402 until the diversity combiner 312 has made a final "hard decision", based on the Walsh symbol hypotheses produced by each receiver finger, as to the actual index ($I_{max}'$) of the received Walsh symbol. Upon the index $I_{max}'$ becoming available from diversity combiner 312, an index available line $I_{av}$ enables the stored value of $I_{max}$ to be provided to a digital comparator 406, and the stored beam error signal to be received by a buffer register 408.

If the comparator 406 determines that $I_{max}$ and $I_{max}'$ are equivalent, an output enable signal impressed upon line 407 results in the error signal stored within buffer register 408 being added to the contents of accumulator register 410. When the content of accumulator register 410 overflows above an upper threshold, or underflows below a lower threshold, a beam switching signal of the appropriate polarity is provided to controller 244. Upon receiving a beam switching signal the controller 244 issues a RESET instruction which results in the accumulator 410 being cleared. A RESET instruction is also provided when a receiver becomes "out of lock" with the received symbol data, i.e., when comparator 406 determines that $I_{max}$ is not equivalent to $I_{max}'$.

F. Circular Antenna Array

Figure 11:
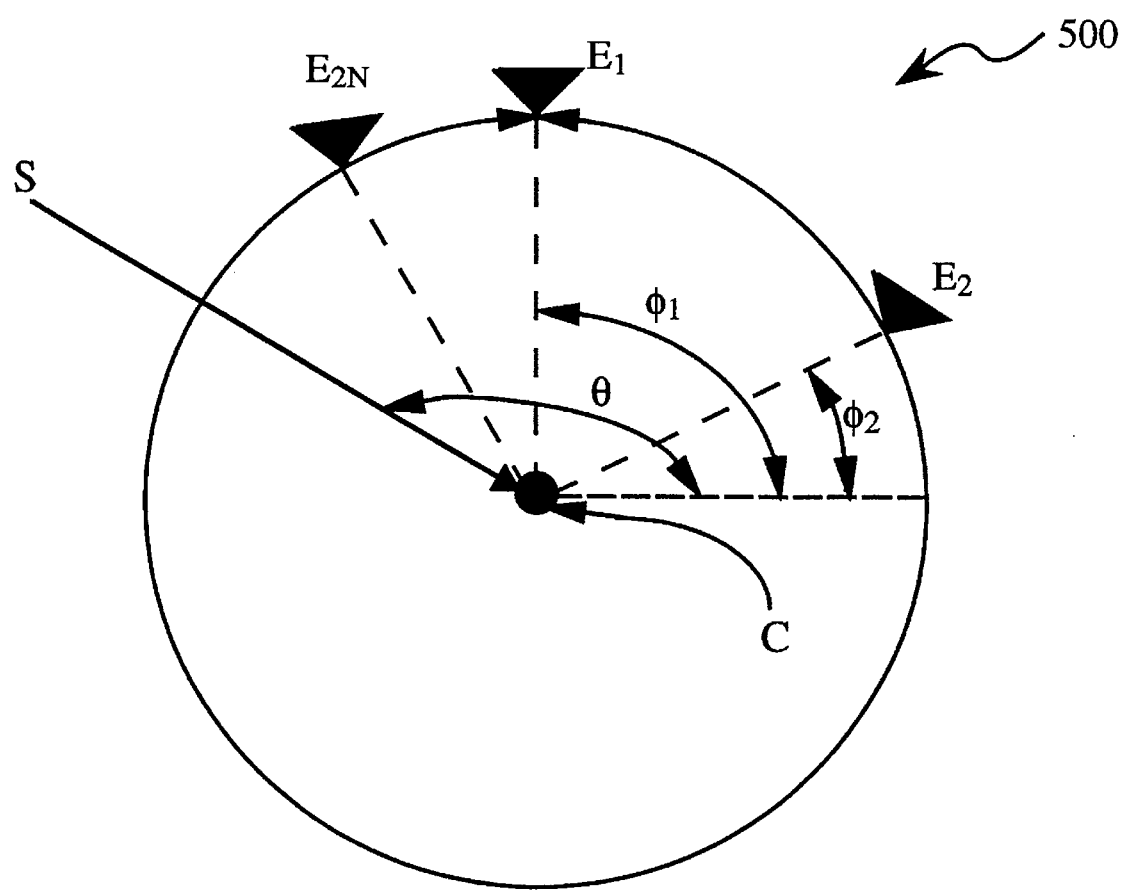
FIG. 11 provides an illustrative representation of a circular antenna array.

Referring to FIG. 11, there is provided an illustrative representation of a circular antenna array 500. The circular array is assumed to be of radius R, and includes 2N uniformly-spaced antenna elements $E_i$, i=1 to 2N, at the following coordinate locations:

$$(x_i, y_i) = \left( R\cos\left(\pi\left(\frac{2i-1}{2N}\right)\right), R\sin\left(\pi\left(\frac{2i-1}{2N}\right)\right) \right), i = 1, \ldots, 2N \quad (4)$$

The circular array 500 may be characterized by a gain pattern $G(\theta-\phi_i)$, where $\theta$ specifies the direction of arrival of the incident electromagnetic signal S, and where $\phi_i$ is indicative of the position the antenna element $E_i$. As is evident from FIG. 11, the signal S will arrive at different times at each of the antenna elements $E_i$. The time delay $\tau_i$ between arrival of the incident signal S at the center C of the array 500 and the arrival at the element $E_i$ may be expressed as:

In addition, the received signal energy $X_i(t)$ generated by the element $E_i$ upon receipt $$\tau_i = \frac{R}{c}\cos(\theta-\phi_i) \rightarrow \alpha_i = 2\pi f_c \tau_i = \quad (5)$$

$$\frac{2\pi R}{\lambda}\cos(\theta-\phi_i), \phi_i = \pi\left(\frac{2i-1}{2N}\right), i = 1, \ldots, 2N$$

of the incident signal S is given by:

$$X_i(t) = S(t-\tau_i)\sqrt{G_i(\theta-\phi_i)}\exp(j(2\pi f_c t + \alpha_i)) \quad (6)$$

where $f_c$ is the center frequency of the incident signal S, and where $\alpha_i$ represents the phase shift due to spatial separation between antenna elements $E_i$ and $E_{i-1}$. Assuming each delay $\tau_i$ to be much shorter than the PN chip period, the quantity $S(t-\tau_i)$ remains relatively constant over the range $1 \leq i \leq 2N$. In the preferred embodiment the antenna radius R will be less than approximately 30 meters, and hence each delay $\tau_i$ will be on the order of a fraction of nanosecond. Thus, $$X_i(t) \approx S(t)\sqrt{G_i(\theta-\phi_i)}\exp(j(2\pi f_c t))\exp(j\alpha_i) \quad (7)$$

The resultant composite received signal Y(t) produced by the array may be expressed as:

$$Y(t) = \sum_{i=0}^{2N-1} X_i(t)w_i \quad (8)$$

where $w_i$ denotes the weight assigned to the signal energy $X_i(t)$ from the array element $E_i$. Within an array beam processing network (not shown), the signals $X_i(t)$ are weighted so as to maximize the signal to noise ratio (S/N) of the energy received by the array. The signal to noise ratio S/N is proportional to $Y(t)/I_T(t)$, where the parameter $I_T(t)$ is representative of the total interference power received by all the elements $E_i$ within the array. The parameter $I_T(t)$ is defined as:

$$I_T(t) = \sum_{i=0}^{2N-1} [I_i(t) + N_0] w_i \quad (9)$$

in which $I_i(t)$ corresponds to the interference power received at the $i^{th}$ array element $E_i$. A weighting operation designed to maximize the S/N ratio of received signal energy may be performed in accordance with well-known array design techniques such as are described by, for example, Pillai, S. Unnikrishna, in *Array Signal Processing*; pp. 16–17; Springer-Verlag, New York, N.Y. (1989).

The previous description of the preferred embodiments is provided to enable any person skilled in the art to make or use the present invention. The various modifications to these embodiments will be readily apparent to those skilled in the art, and the generic principles defined herein may be applied to other embodiments without the use of inventive faculty. Thus, the present invention is not intended to be limited to the embodiments shown herein but is to be accorded the widest scope consistent with the principles and novel features disclosed herein.

What is claimed is:

1. A digital communication system in which information signals are communicated among a plurality of users, said system comprising:

means for providing at least first and second electromagnetic beams for receiving components of said information signals transmitted by said users;

means for allocating said first electromagnetic beam to receive a first of said information signal components transmitted over a first transmission path so as to generate a first received signal, said first information signal component comprising at least a portion of a first information signal transmitted by a first of said users;

means for generating a first beam signal from said first received signal;

a first beam tracking network for generating a first beam tracking signal by demodulating said first beam signal; and beam switching means for spatially tracking said first signal component by assigning said second electromagnetic beam to receive said first signal component based upon said first beam tracking signal.

2. The system of claim 1 further including means for generating a second beam signal from a second received signal derived from said second electromagnetic beam, said means for generating said first and second beam signals including means for sampling said first and second received signals in order to generate first and second sampled received signals.

3. The system of claim 2 wherein said means for demodulating includes means for adjusting timing at least of said first sampled received signal in accordance with said first beam tracking signal.

4. The system of claim 1 wherein said beam tracking network includes means for spatially tracking said first component of said information signal, said means for spatially tracking including an accumulator for generating a cumulative error signal by accumulating said beam tracking signal.

5. The system of claim 1 wherein said means for providing said first and second electromagnetic beams is disposed within a base station of said digital communication system, said means for providing said first and second beams including an antenna network.

6. The system of claim 1 further including means for providing third and fourth electromagnetic beams for receiving a second information signal component over a second transmission path so as to generate third and fourth received signals, said second information signal component comprising a second portion of said first information signal.

7. The system of claim 6 further including:

means for generating third and fourth beam signals from said third and fourth received signals;

means for demodulating said third and fourth beam signals in order to provide third and fourth estimates of said information signal; and a second tracking network for generating a second tracking signal based on said third and fourth estimates of said information signal.

8. The system of claim 2 further including:

means for demodulating said second beam signal;

means for generating a set of symbol estimation signals by correlating said first beam signal with a corresponding set of information symbol sequences, means for selecting one of said information symbol sequences by comparing said symbol estimation signals.

9. The system of claim 8 wherein said means for demodulating said first and second beam signals includes means for correlating said selected one of said information symbol sequences with said second beam signal.

10. A digital communication system in which information signals are communicated among a plurality of users, said system comprising;

means for providing a set of electromagnetic beams for receiving multipath signal components of a plurality of information signals transmitted by a corresponding plurality of users so as to generate a set of received signals;

switching means for spatially tracking said multipath signal components by altering allocation of subsets of said beam signals among a plurality of traffic channels, each of said traffic channels being associated with one of said plurality of users; and receiver means for recovering a first of said information signals from a first of said subsets of beam signals allocated to a first of said traffic channels associated with a first of said users.

11. The communication system of claim 10 wherein said first receiver means includes first and second receiver fingers for processing first and second multipath signal components of said first information signal.

12. The communication system of claim 11 wherein said switching means includes means for assigning a first of said subsets of beam signals to said first receiver finger and a second of said subsets of beam signals to said second receiver finger.

13. The communication system of claim 10 wherein said first receiver finger includes a first demodulator for demodulating said beam signals included in said first set of beam signals in order to provide a corresponding first set of estimates of said first information signal; and a first tracking network for generating a first tracking signal based on said first set of estimates of said information signal.

14. The system of claim 13 wherein said first demodulator includes means for correlating said beam signals included within said first set of beam signals using a spread spectrum sequence.

15. The system of claim 10 wherein means for generating a set of beam signals includes:
   means for sampling said set of received signals in order to generate quantized signals;
   means for weighting said quantized signals; and
   means for summing ones of said weighted quantized signals.

16. The system of claim 10 wherein said receiver means includes a plurality of receivers coupled to said switching means, each of said receivers including a receiver finger for processing one of said subsets of said beam signals.

17. A digital communication system in which information signals are communicated via at least one base station among a plurality of users, said system comprising:
   an array of antenna elements, located at said base station, for providing a first set of electromagnetic beams for receiving information signals transmitted by said plurality of users to as to generate a first set of received signals;
   a first beam-forming matrix, coupled to said array of antenna elements, for producing a first set of beam signals based on samples to said set of received signals, said beam-forming matrix including means for weighting and combining selected ones of said received signal samples;
   switching means for spatially tracking said information signals received at said base station by altering allocation of subsets of said beam signals among a plurality of traffic channels wherein each of said traffic channels is associated with one of said plurality of users; and
   a set of receivers coupled to said switching means, each of said receivers including means for extracting an information signal from the subset of beam signals allocated to one of said traffic channels.

18. The system of claim 17 further including a remote array of antenna elements, displaced from said base station and operatively connected to said beam matrix, for providing a second set of electromagnetic beams for receiving information signals transmitted by said plurality of users so as to generate a second set of received signals
   a second beam-forming matrix, coupled to said remote array of antenna elements, for producing a second set of beam signals based on samples of said set of received signals, said second beam-forming matrix including means for weighting and combining selected ones of said samples of said signals included within said second set of received signals, said beam-forming matrix being operatively connected to a switch matrix included within said switching means.

19. A method for communicating information signals among a plurality of users within a digital communication system, said method comprising the steps of:
   providing first and second electromagnetic beams for receiving a first information signal component over a first transmission path so as to generate first and second received signals, said first information signal component comprising at least a portion of a first information signal transmitted by a first of said users;
   generating first and second beam signals from said first and second received signals;
   demodulating said first and second beam signals in order to provide first and second estimates of said information signal; and
   generating a first tracking signal based on said first and second estimates of said information signal, said first tracking signal being useable to spatially track said first transmission path.

20. The method of claim 19 wherein said step of generating said first and second beam signals includes the step of sampling said first and second received signals in order to produce first and second sampled received signals.

21. The method of claim 20 wherein said step of demodulating includes the step of adjusting timing of said first and second sampled received signals in accordance with said first tracking signal.

22. The method of claim 19 wherein said step of tracking includes the step of spatially tracking said first component of said information signal, said step of spatially tracking including the step of generating a cumulative error signal by accumulating said tracking signal.

23. The method of claim 19 wherein said step of providing said first and second electromagnetic beams is performed within a base station of said digital communication system.

24. The method of claim 19 further including the step of providing third and fourth electromagnetic beams for receiving a second information signal component over a second transmission path so as to generate third and fourth received signals, said second information signal component comprising a second portion of said first information signal.

25. The method of claim 24 further including the steps of:
   generating third and fourth beam signals from said third and fourth received signals;
   demodulating said third and fourth beam signals in order to provide third and fourth estimates of said information signal; and
   generating a second tracking signal based on said third and fourth estimates of said information signal.

26. The method of claim 19 further wherein said step of demodulating said first and second beam signals includes the steps of:
   generating a set of symbol estimation signals by correlating said first beam signal with a corresponding set of information symbol sequences,
   selecting one of said information symbol sequences by comparing said symbol estimation signals.

27. The method of claim 26 wherein said step of demodulating said first and second beam signals includes the step of correlating said selected one of said information symbol sequences with said second beam signal.

28. A method for communicating information signals among a plurality of users within a digital communication system, said method comprising the steps of:
   providing a set of electromagnetic beams for receiving multipath signal components of a plurality of information signals transmitted by a corresponding plurality of users so as to generate a set of received signals;
   generating a set of beam signals based on said set of received signals;
   spatially tracking said multipath components by altering allocation (of subsets of said beam signals among a plurality of traffic channels, each of said traffic channels being associated with one of said plurality of users; and
   recovering a first of said information signals from a first of said subsets of beam signals allocated to a first of said traffic channels associated with a first of said users.

29. The method of claim 28 wherein said step of recovering includes the step of processing first and second multipath signal components of said first information signal using first and second receiver fingers, respectively, of a first receiver.

30. The method of claim 29 wherein said step of allocating includes the step of assigning a first of said subsets of beam signals to said first receiver finger and a second of said subsets of beam signals to said second receiver finger.

31. The method of claim 28 further including the steps of:
demodulating said beam signals included in said first set of beam signals in order to provide a corresponding first set of estimates of said first information signal, and
generating a first tracking signal based on said first set of estimates of said information signal.

32. The method of claim 31 wherein said step of demodulating includes the step of correlating said beam signals included within said first set of beam signals using a spread spectrum sequence.

33. The method of claim 28 wherein said step of generating a set of beam signals includes the steps of:
sampling said set of received signals in order to generate quantized signals;
weighting said quantized signals; and
summing ones of said weighted quantized signals.

* * * * *